US012765440B2

(12) United States Patent
Sibley et al.

(10) Patent No.: US 12,765,440 B2
(45) Date of Patent: Oct. 20, 2026

(54) DETECTION AND INSTANT CONFIRMATION OF TREATMENT ACTION

(71) Applicant: Verdant Robotics, Inc., Hayward, CA (US)

(72) Inventors: Gabriel Thurston Sibley, Alameda, CA (US); Lorenzo Ibarria, Dublin, CA (US); Curtis Dale Garner, Sand City, CA (US); Patrick Christopher Leger, Belmont, CA (US); Dustin James Webb, Murray, UT (US)

(73) Assignee: Verdant Robotics, Inc., Hayward, CA (US)

( * ) Notice: Subject to any disclaimer, the term of this patent is extended or adjusted under 35 U.S.C. 154(b) by 506 days.

(21) Appl. No.: 18/165,151

(22) Filed: Feb. 6, 2023

(65) Prior Publication Data

US 2023/0252789 A1 Aug. 10, 2023

Related U.S. Application Data

(60) Provisional application No. 63/306,852, filed on Feb. 4, 2022.

(51) Int. Cl.
*G06V 20/52* (2022.01)
*A01B 69/04* (2006.01)
(Continued)

(52) U.S. Cl.
CPC ......... *A01B 69/008* (2013.01); *G05D 1/0038* (2013.01); *G05D 1/0088* (2013.01);
(Continued)

(58) Field of Classification Search
CPC .... A01B 69/008; A01B 79/005; A01M 21/00; A01M 7/0089; G05D 1/0038;
(Continued)

(56) References Cited

U.S. PATENT DOCUMENTS

| | | | |
|---|---|---|---|
| 4,555,725 | A | 11/1985 | Geiersbach |
| 10,681,905 | B2 | 6/2020 | Tanner et al. |

(Continued)

FOREIGN PATENT DOCUMENTS

| | | | |
|---|---|---|---|
| CA | 3111595 | A1 | 3/2020 |
| CN | 111246735 | A | 6/2020 |

(Continued)

OTHER PUBLICATIONS

International Search Report and Written Opinion mailed Jan. 26, 2023 for International Patent Application No. PCT/US2022/077799.

(Continued)

*Primary Examiner* — Michael J Vanchy, Jr.

(74) *Attorney, Agent, or Firm* — Ashurst Perkins Coie US LLP

(57) ABSTRACT

A computer-implemented method of sensor input processing, implemented by an agricultural platform comprising a processor and a sensor, includes capturing, using the sensor, sensor images of a vicinity of a target object of a time interval during which a treatment is applied to the target object; processing the sensor images using one or more machine learning (ML) algorithms wherein at least one ML algorithm uses an ML model trained to detect a presence of a treatment action in the vicinity of the target object; and providing, selectively based on a result of detecting the presence of the treatment action in the vicinity of the target object, an outcome of the processing for further processing.

20 Claims, 22 Drawing Sheets

(51) Int. Cl.

| | |
|---|---|
| ***G05D 1/00*** | (2006.01) |
| ***G06N 5/022*** | (2023.01) |
| ***G06V 10/77*** | (2022.01) |
| ***G06V 10/774*** | (2022.01) |
| ***G06V 10/776*** | (2022.01) |
| ***G06V 10/778*** | (2022.01) |
| ***G06V 10/94*** | (2022.01) |
| ***G06V 20/10*** | (2022.01) |
| *A01M 21/00* | (2006.01) |

(52) U.S. Cl.

CPC ............. *G06N 5/022* (2013.01); *G06V 10/77* (2022.01); *G06V 10/774* (2022.01); *G06V 10/776* (2022.01); *G06V 10/7788* (2022.01); *G06V 10/945* (2022.01); *G06V 20/188* (2022.01); *G06V 20/52* (2022.01); *A01M 21/00* (2013.01)

(58) Field of Classification Search

CPC ........ G05D 1/0088; G06N 20/00; G06N 5/01; G06N 5/022; G06V 10/77; G06V 10/774; G06V 10/776; G06V 10/7788; G06V 10/809; G06V 10/945; G06V 20/188; G06V 20/52

See application file for complete search history.

(56) References Cited

U.S. PATENT DOCUMENTS

| | | | | |
|---|---|---|---|---|
| 10,713,484 | B2 | 7/2020 | Polzounov et al. | |
| 10,823,591 | B2 | 11/2020 | Yang | |
| 11,076,589 | B1 | 8/2021 | Sibley et al. | |
| 11,195,015 | B2 | 12/2021 | Tran et al. | |
| 11,399,531 | B1 | 8/2022 | Sibley et al. | |
| 11,517,008 | B1 | 12/2022 | Sibley et al. | |
| 11,785,873 | B2 | 10/2023 | Sibley et al. | |
| 11,997,767 | B2 | 5/2024 | Lee et al. | |
| 12,340,287 | B2 | 6/2025 | Horowitz et al. | |
| 2001/0016788 | A1 | 8/2001 | Hauwiller et al. | |
| 2003/0152186 | A1 | 8/2003 | Jurczyk et al. | |
| 2003/0205460 | A1 | 11/2003 | Buda | |
| 2005/0167588 | A1 | 8/2005 | Donnangelo | |
| 2007/0100547 | A1 | 5/2007 | Chang | |
| 2008/0141072 | A1 | 6/2008 | Kalgren et al. | |
| 2008/0157990 | A1 | 7/2008 | Bowen et al. | |
| 2010/0169030 | A1 | 7/2010 | Parlos | |
| 2013/0129142 | A1 | 5/2013 | Miranda-Steiner | |
| 2015/0015697 | A1 | 1/2015 | Redden et al. | |
| 2015/0237790 | A1 | 8/2015 | Redden et al. | |
| 2016/0202227 | A1 | 7/2016 | Mathur | |
| 2016/0223506 | A1 | 8/2016 | Shriver et al. | |
| 2016/0361949 | A1 | 12/2016 | Cavender-Bares et al. | |
| 2017/0016870 | A1 | 1/2017 | Mcpeek | |
| 2017/0030877 | A1 | 2/2017 | Miresmailli et al. | |
| 2017/0061249 | A1 | 3/2017 | Estrada | |
| 2017/0071188 | A1 | 3/2017 | Rees | |
| 2017/0278159 | A1 | 9/2017 | Chung | |
| 2017/0328716 | A1 | 11/2017 | Ma | |
| 2017/0334560 | A1 | 11/2017 | O'Connor et al. | |
| 2017/0359943 | A1 | 12/2017 | Calleija et al. | |
| 2018/0153084 | A1 | 6/2018 | Calleija et al. | |
| 2018/0160672 | A1 | 6/2018 | Crinklaw et al. | |
| 2018/0232904 | A1 | 8/2018 | Zakharevich | |
| 2018/0276573 | A1 | 9/2018 | Otillar | |
| 2018/0330166 | A1* | 11/2018 | Redden | G06V 20/188 |
| 2018/0330435 | A1 | 11/2018 | Garg | |
| 2018/0373932 | A1 | 12/2018 | Albrecht et al. | |
| 2018/0373980 | A1 | 12/2018 | Huval | |
| 2019/0035071 | A1 | 1/2019 | Klein | |
| 2019/0147610 | A1 | 5/2019 | Frossard et al. | |
| 2019/0150357 | A1* | 5/2019 | Wu | H04N 23/51 |
| 2019/0243364 | A1 | 8/2019 | Cohen | |
| 2019/0303668 | A1 | 10/2019 | King | |
| 2019/0362146 | A1* | 11/2019 | Polzounov | G06N 3/08 |
| 2020/0005063 | A1 | 1/2020 | Ralls et al. | |
| 2020/0029490 | A1 | 1/2020 | Bertucci et al. | |
| 2020/0049491 | A1 | 2/2020 | Barton | |
| 2020/0073389 | A1 | 3/2020 | Flajolet | |
| 2020/0107537 | A1 | 4/2020 | Brown et al. | |
| 2020/0120886 | A1 | 4/2020 | Geltner | |
| 2020/0187406 | A1 | 6/2020 | Redden | |
| 2020/0187433 | A1 | 6/2020 | Redden et al. | |
| 2020/0342225 | A1 | 10/2020 | Schumann et al. | |
| 2020/0359550 | A1 | 11/2020 | Tran et al. | |
| 2020/0359582 | A1 | 11/2020 | Tran et al. | |
| 2020/0364456 | A1 | 11/2020 | Tran et al. | |
| 2020/0364843 | A1 | 11/2020 | Stueve et al. | |
| 2021/0042530 | A1 | 2/2021 | Kim | |
| 2021/0090274 | A1 | 3/2021 | Fu et al. | |
| 2021/0103728 | A1 | 4/2021 | Young | |
| 2021/0144903 | A1 | 5/2021 | Javault et al. | |
| 2021/0144911 | A1 | 5/2021 | Plattner | |
| 2021/0149406 | A1 | 5/2021 | Javault et al. | |
| 2021/0153500 | A1* | 5/2021 | Kuenzi | G06V 10/56 |
| 2021/0158041 | A1 | 5/2021 | Chowdhary et al. | |
| 2021/0192754 | A1 | 6/2021 | Sibley et al. | |
| 2021/0244274 | A1 | 8/2021 | Claggett | |
| 2021/0299692 | A1 | 9/2021 | Van De Woestyne | |
| 2021/0319195 | A1 | 10/2021 | Chakravarty | |
| 2021/0345567 | A1 | 11/2021 | Klemm et al. | |
| 2021/0350162 | A1 | 11/2021 | Miller et al. | |
| 2021/0357664 | A1 | 11/2021 | Kocer et al. | |
| 2022/0019796 | A1 | 1/2022 | Mcnichols et al. | |
| 2022/0053122 | A1 | 2/2022 | Scheiner et al. | |
| 2022/0092705 | A1 | 3/2022 | Khait | |
| 2022/0104435 | A1 | 4/2022 | Stewart et al. | |
| 2022/0125032 | A1 | 4/2022 | Ascherl | |
| 2022/0142142 | A1 | 5/2022 | Van Alphen | |
| 2022/0183208 | A1 | 6/2022 | Sibley et al. | |
| 2022/0398829 | A1* | 12/2022 | Iventosch | G06V 10/774 |
| 2023/0011505 | A1 | 1/2023 | Sibley et al. | |
| 2023/0090714 | A1 | 3/2023 | Long et al. | |
| 2023/0118737 | A1 | 4/2023 | Sibley et al. | |
| 2023/0121291 | A1 | 4/2023 | Sibley et al. | |
| 2023/0122084 | A1 | 4/2023 | Sibley et al. | |
| 2023/0124667 | A1 | 4/2023 | Sibley et al. | |
| 2023/0247928 | A1 | 8/2023 | Sibley et al. | |
| 2023/0252318 | A1 | 8/2023 | Webb | |
| 2023/0252773 | A1 | 8/2023 | Leger et al. | |
| 2023/0252791 | A1 | 8/2023 | Webb et al. | |
| 2023/0404056 | A1 | 12/2023 | Sibley et al. | |
| 2024/0057502 | A1 | 2/2024 | Sibley et al. | |
| 2024/0251694 | A1 | 8/2024 | Sibley et al. | |

FOREIGN PATENT DOCUMENTS

| | | | |
|---|---|---|---|
| CN | 112036265 | A | 12/2020 |
| CN | 108135122 | B | 9/2021 |
| CN | 113902730 | A | 1/2022 |
| DE | 102021002798 | A1 | 7/2021 |
| EP | 3763209 | A1 | 1/2021 |
| JP | 2017037681 | A | 2/2017 |
| KR | 20210089212 | A | 7/2021 |
| WO | 2016090414 | A1 | 6/2016 |
| WO | 2018129131 | A1 | 7/2018 |
| WO | 2021001318 | A1 | 7/2021 |
| WO | 2023069841 | A1 | 4/2023 |
| WO | 2023069842 | A1 | 4/2023 |

OTHER PUBLICATIONS

International Search Report & Written Opinion mailed Jan. 17, 2023 for International Patent Application No. PCT/US2022/077798 (13 pages).

International Search Report and Written Opinion for International Patent Application No. PCT/US2020/052071, dated Dec. 17, 2020.

International Search Report and Written Opinion for International Patent Application No. PCT/US2020/061684, dated Feb. 24, 2021.

U.S. Patent & Trademark Office, Non-Final Office Action for U.S. Appl. No. 17/932,566, mailed on Apr. 21, 2023, 22 pages.

(56) References Cited

OTHER PUBLICATIONS

MacKellar, B., "Stand uniformity: Planter tips that can impact seed placement and planting depth." Michigan State University Extension, Apr. 12, 2019, 4 pages.
Final Office Action mailed Feb. 26, 2025 for U.S. Appl. No. 18/459,405, 34 pages.
Notice of Allowance mailed Jun. 11, 2025 for U.S. Appl. No. 18/459,405, 10 pages.
Non-Final Office Action mailed Jun. 4, 2025 for U.S. Appl. No. 18/194,520, 23 pages.
Ahmed, I. et al., "Automatic detection and segmentation of lentil crop breeding plots from multi-spectral images captured by UAV-mounted camera." IEEE Winter Conference on Applications of Computer Vision (WACV), 2019, pp. 1673-1681.
Casado-Garcia, A. et al., "Ensemble Methods for Object Detection." 2020, 8 pages.
Lee, J., et al., "An Ensemble of CNN Models for Object Detection." IEEE, 2018, 4 pages.
Solovyev, R. et al., "Weighted boxes fusion: Ensembling boxes from different object detection models." Image and Vision Computing 107 (2021), 6 pages.

* cited by examiner

DETECTION AND INSTANT CONFIRMATION OF TREATMENT ACTION

CROSS-REFERENCE TO RELATED APPLICATIONS

This patent documents claims the benefit of priority of U.S. Provisional Patent Application 63/306,852, entitled "TRAINING AN AGRICULTURAL IMAGE PROCESSING SYSTEM BASED ON USER FEEDBACK," filed on Feb. 4, 2022. The entirety of the aforementioned patent application is incorporated herein by reference.

TECHNICAL FIELD

The present patent document relates to machine learning and robotic implementation of agricultural activities.

BACKGROUND

Global human population growth is expanding at a rate projected to reach 10 billion or more persons within the next 40 years, which, in turn, will concomitantly increase demands on producers of food. To support such population growth, food production, for example on farms and orchards, need to generate collectively an amount of food that is equivalent to an amount that the entire human race, from the beginning of time, has consumed up to that point in time. Many obstacles and impediments, however, likely need to be overcome or resolved to feed future generations in a sustainable manner.

To support such an increase in demand, agricultural technology has been implemented to more effectively and efficiently grow crops, raise livestock, and cultivate land. Such technology in the past has helped to more effectively and efficiently use labor, use tools and machinery, and reduce the amount of chemicals used on plants and cultivated land.

However, many techniques used currently for producing and harvesting crops are only incremental steps from a previous technique. The amount of land, chemicals, time, labor, and other costs to the industry still pose a challenge. A new and improved system and method of performing agricultural services is needed.

SUMMARY

Techniques for detection of and controlling growth of undesirable vegetation in a field are described.

In one example aspect, a computer-implemented method of sensor input processing includes performing, using a processor onboard a vehicle, a machine learning (ML) processing on sensor inputs from sensors onboard the vehicle, identifying, according to a rule; a subset of data resulting from the ML processing; and generating the subset of data for modifying the ML processing for a subsequent use. The subsequent use may be either in a same agricultural environment that the vehicle is operating in or in a different agricultural environment.

In another example aspect, a method includes performing, using a processor onboard a vehicle, a machine learning (ML) processing on sensor input from sensors onboard the vehicle, identifying, according to a rule, a subset of data resulting from the ML processing, and generating and displaying, in real-time, the subset of data to a user interface, thereby enabling enable a user interaction with the subset of data.

In another example aspect, A processor-implemented method includes performing, using a processor onboard a vehicle, a Machine Learning (ML) processing on sensor input from sensors onboard the vehicle, identifying, according to a rule, a subset of data resulting from the ML processing; and providing the subset of data to a user interface.

In another example aspect, a computer-implemented method of processing agricultural images is disclosed. The method includes capturing, using one or more cameras deployed on an agricultural platform images of an agricultural environment in which the agricultural platform is operating; annotating the images using a first machine learning (ML) algorithm, wherein each annotation includes a confidence number associated with the each annotation, and wherein the first ML algorithm is trained based on a second set of images captured by the one or more cameras; generating a subset of the images as a training set for further training of the first ML algorithm, wherein the subset of the images in the training set is generated partially based on a user feedback; and transmitting the subset of images to a training platform that generates a second ML model by training of the first ML algorithm using the subset of image data.

In one example aspect, another computer-implemented method of processing agricultural images is disclosed. The method includes annotating agricultural images using N machine learning (ML) models, where N is an integer greater than 1; presenting results of annotation by the N ML models on a user interface; receiving a user feedback for the results of annotation by the N ML models; and generating a set of training images based on the user feedback In one example aspect, another computer-implemented method of processing agricultural images is disclosed. The method includes capturing real-world images of an agricultural environment, wherein each real-world image comprises a plurality of pixels, wherein a corresponding depth value and corresponding one or more color values are associated with each pixel of the plurality of pixels; and detecting one or more agricultural objects of interest in the real-world images by applying multiple image processing schemes to the real-world images, wherein the multiple image processing schemes include a depth value-based image processing scheme and a color value-based image processing scheme, wherein at least one of the multiple image processing schemes use a machine learning (ML) model.

In another example aspect, a computer-implemented method of sensor input processing, implemented by an agricultural platform comprising a processor and a sensor is disclosed. The method includes receiving sensor input from the sensor; processing the sensor input by multiple machine learning (ML) algorithms, each using a corresponding ML model for generating labels for objects identified in the sensor input; combining labels generated by each ML algorithm to generate a super-imposed labeled sensor input frame; comparing outputs of the ML algorithms to determine similarities or differences; and using results of the comparing for improving an operational characteristic of the sensor input processing.

In another aspect, another method of processing agricultural images is disclosed. The method includes comparing object detections performed by multiple image processing schemes to determine a set of ground truth images from which at least one machine learning (ML) models used by at least one ML algorithm included in the multiple image processing schemes is trained, wherein the multiple image processing schemes include two or more of; (a) an image processing scheme that includes a cascade of multiple ML algorithms; (b) an image processing scheme that includes image annotation based on user feedback; (c) an image processing scheme that includes a cascade of an ML algorithm or a computer vision (CV) algorithm and a user feedback In another example aspect, an apparatus is disclosed. The apparatus may be used as an agricultural vehicle and comprises a processor.

In another example aspect, a computer-readable medium is disclosed. The computer-readable medium stores processor-executable code that, upon execution, causes a processor to implement a method disclosed in the present document.

These, and other, aspects are described throughout the present document.

BRIEF DESCRIPTION OF THE DRAWINGS

The present disclosure will become better understood from the detailed description and the drawings.

DETAILED DESCRIPTION

Figure 1:
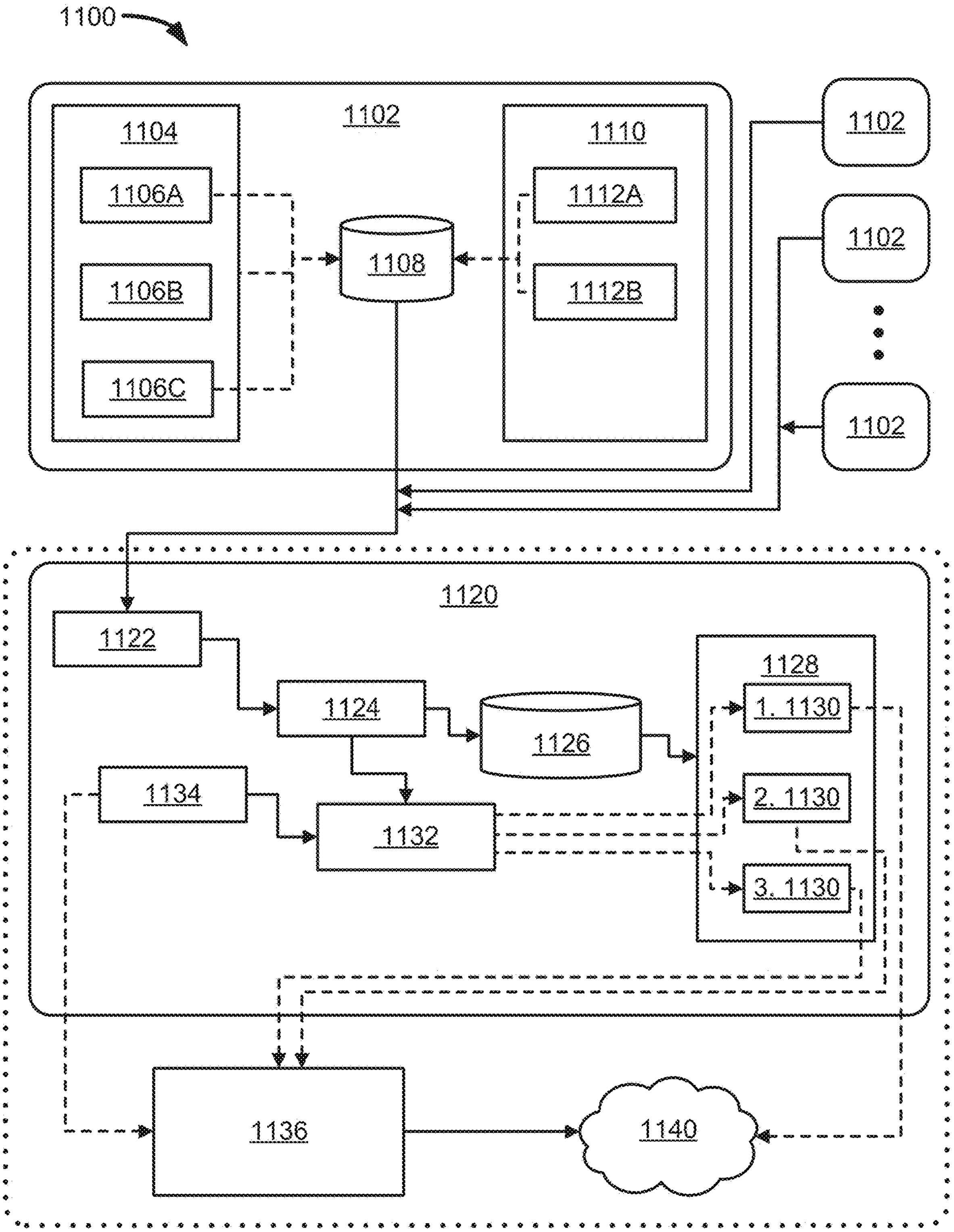
FIG. 1 shows an example of an agricultural automation system.

In this specification, reference is made in detail to specific embodiments of the disclosure. Some of the embodiments or their aspects are illustrated in the drawings.

For clarity in explanation, the present document has been described with reference to specific embodiments, however it should be understood that the disclosure is not limited to the described embodiments. On the contrary, the disclosure covers alternatives, modifications, and equivalents as may be included within its scope as defined by any patent claims. The following embodiments of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and anon-transitory computer-readable medium. The memory and non-transitory medium may store instructions for performing methods and steps described herein. Various examples and embodiments described below relate generally to robotics, autonomous driving systems, and autonomous agricultural application systems, such as an autonomous agricultural observation and treatment system, utilizing computer software and systems, computer vision and automation to autonomously identify an agricultural object including any and all unique growth stages of agricultural objects identified, including crops or other plants or portions of a plant, characteristics and objects of a scene or geographic boundary, environment characteristics, or a combination thereof.

Introduction

Automation of agricultural tasks holds the promise of various operational and efficiency improvements to the agricultural and farming industry. For example, various agricultural tasks may be performed by machines that are controlled by a computer system. One technology that enables automation of agricultural tasks is the ability of a computer to analyze sensor input such as visual images of a farm and identify various objects in order to decide which tasks to perform and which objects should be subject to these tasks. The present document provides techniques that may be used in such computer systems to alleviate computational complexity and provide accuracy execution of object identification and subsequent agricultural tasks.

U.S. patent application Ser. No. 17/506,588, filed on Oct. 20, 2021, entitled "Autonomous Detection and Control of Vegetation," incorporated herein by reference in entirety, describes various embodiments of an agricultural platform that includes cameras that capture images of agricultural environment, a machine learning (ML) model-based computational framework that analyzes the captured images, and controls a treatment mechanism that treats the agricultural objects such as spraying a pesticide or targeting unwanted vegetation with laser beams. For example, in some embodiments, an ML algorithm may be used to process images to identify various plants, fruits, flowers, weeds, and other objects typically found in an agricultural environment using one or more ME models. During a run of the agricultural platform in the real-world agricultural setting, the onboard cameras may capture images that may be used for further improvements to the ML models to be able to achieve a desired task (e.g., identify weeds being different from crop, or identify fruits, etc.).

During the operation of such an agricultural platform, the number of images captured and the corresponding pixel data generated could run into terabytes on a daily basis. Such an amount of data is impractical for use to train the ML model. For example, training of the ML model may need to be performed using a select few images that would be considered ground truth to train an ML model. The present document provides techniques that may be used for (1) reducing the number of images used for training and/or (2) techniques that allow for selection of images suitable for ML model training in generation of the reduced set of images.

In some cases, it may be desirable to not just identify various agricultural objects, but also be able to obtain an understanding of objects in various stages of development. For example, an ML model may be trained to discern between a fruit (e.g., an apple) and leaves. However, it may also be desirable to identify a growth stage of the apple using ML model (e.g., is the apple ripe?). In some cases, training an ML algorithm to be able to annotate image data may therefore need training by user feedback in which a user provide supervision to the training performed by an ML model to allow the ML model to improve its accuracy and also granularity of labeling various object characteristics.

In some embodiments, multiple ML models may be used to process a same set of images. These ML models may be different trained versions of a same underlying model or may be models that are created using a different set of hyperparameters. Results from the multiple ML models may be compared for similarities and differences. Such similarities and differences may be highlighted to a human user. The human user may provide a feedback regarding accuracy of identification or classification, which may be used to further train the ML models. In some cases, ML models may entirely fail to identify an object with a high degree of accuracy (e.g., probability of accuracy above a threshold). In such cases, the human user may be prompted in real-time in the field to check the location of the undetected object and provide feedback to the ML model to allow improvements in the ML model. Thus, an active learning procedure may be implemented in which an ML algorithm may request a user feedback for a portion am image to better train the ML model in real-time during an ongoing operation in an agricultural environment.

An Example Embodiment

FIG. 1 shows an example block diagram of an agricultural automation system. An agricultural computer platform (1102) may be deployed in an agricultural environment and may comprise a number of agricultural vehicles that operate in the agricultural setting and collect images during ongoing operation of the agricultural vehicle (e.g., a tractor equipped with a computer platform) in the field. A manifest may be generated for these images during the extraction 1104. Images may be stored into a database 1108 that may be used to store the captured images from multiple cameras and sensors fitted on the agricultural vehicles 1106 that have undergone processing such as annotations (1106A), object detection information (1106B), or a manifest generation (1106C). A transfer function 1110 may be used to identify which images in the database 1108 (or a corresponding manifest) are new and suitable for transfer to an offline computing platform 1120 for additional processing. The transfer function 1110 may be operated to monitor images for changes in manifest (1112A) and sending images from the manifest (1112B). For example, the manifest may make it unnecessary to perform actual duplication of images on various databases where images may be simply shared based on manifest information such as a sequence number, a geographic location where captured, a time base information for synchronization, etc.

The offline computing platform 1120 may be located in a computing facility or in the cloud 1140. The offline computing platform 1120 may operation to receive the images collected and processed in the field through a mailbox module (1122), retrieved images (1124), store the retrieved images to a database (1126). The retrieved images and retrieved annotations (1134) may be used to write to a database 1132 (e.g., a Mongo database). The images from the database 1132 may be used to perform further training tasks 1130 by sending to a labeling function 1128. The labeling function 1128 may monitor the images or the manifest in the database 1126 to identify which images should be sent to an annotation service 1136 to performing labeling on the images. The annotation service 1136 may work on images (or manifest) in the cloud 1140 based on the information received from the labeling function 1128. The annotated data may be, for example, data in which boxes have been drawn around an object, or according to different classes. These classes may be based on a type of agricultural object, age of the object, ripeness state of the object, and so on. The labelled images used for training may include location data such as a global positioning system data where the images are captured. In some embodiments, images may be stored in a single database and various functional blocks in the system depicted in FIG. 1 may communicate image data with each other by using a manifest tile, an index file, a pointer, and such, to indicate images in the database rather than transmitting actual image data to each other.

Figure 2:
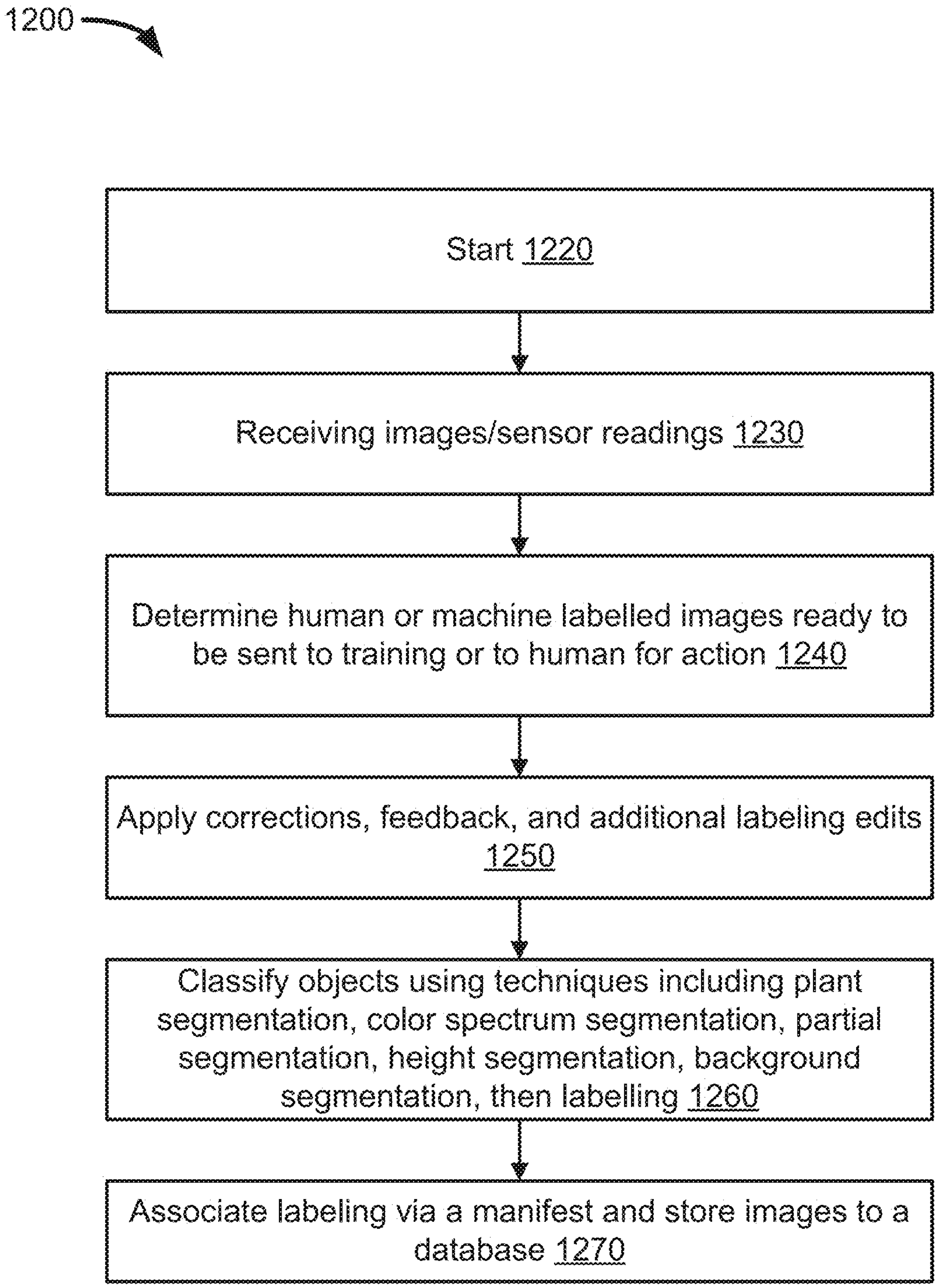
FIG. 2 is a flowchart of an example method of processing agricultural images.

FIG. 2 shows another example method 1200 of processing agricultural images according to various embodiments described herein. The method 1200 starts at 1220. In various embodiments, the method may be implemented by an agricultural vehicle such as a tractor, a drone, a manually operated vehicle or a self-driving vehicle and in particular one or more modules disposed on the vehicle for surveying a farm or for providing a treatment. The vehicle may be called "biff" as an abbreviation. At 1230, images or sensor readings are received at the vehicle. At 1240, received images are analyzed either by a human or by a machine (e.g., using a machine learning ML or a computer vision algorithm) to label certain regions of the image as including agricultural objects of interest. The result of the analysis may be sent for training the ML algorithm (e.g., based on human identified ground truth) or may be displayed to a human operator (e.g., in case that ML/CV is not able to establish identity of an object). At 1250, feedback received from the human or from additional processing is used for applying correction and/or making changes to labels applied to the identified objects. At 1260, object classification may be performed based on a type of agricultural object such a veggie segmentation, a partial segmentation, a height segmentation, background segmentation, etc. and further labeling may be performed. Here, veggie segmentation may mean identifying all veggies into a segment or grouping veggies according to veggie identity into segments (e.g., all cabbage, all cauliflower, all carrots, etc.). Here, a partial segmentation may be performed based on a specific dimension—e.g., segmenting the original frame into square or rectangular tiles. Here, a heigh segmentation may comprise segmenting the images or sensor readings into "strips" or slices such as a strip of image that contains a vegetation row. Here, background segmentation may mean identifying image portions that are neither soil nor weed nor plants, e.g., simply "nothing" and removing such image portions from further processing. At 1270, the labeled image portions may be associated via a manifest and may be uploaded to a database. Further details of the method 1200 are disclosed throughout the present document.

Image Labeling

In an agricultural application, classification of agricultural objects based on various object attributes relevant to the agricultural selling may be performed. In some embodiments, labeling may be used to classify objects according to various attributes. As disclosed throughout the present document, the attributes may include pixel color, pixel depth, object position, a relationship between the object in one image and whether or not the object is in an expected location in an image based on one or more previous images and one or more next images (e.g., solid objects usually only either undergo translational motion or rotational motion from one image to a next image frame). In some cases, the labeling may be unsupervised. Alternatively, in some cases, labeling may be supervised where user feedback may be received for any corrections that may be used for further training of the labeling implementation.

In some implementations, labeling may be achieved by drawing bounding boxes around pixels. In some implementations, labeling may comprise generating a manifest that associates an attribute with every pixel or region of an image. In some cases, labeling may associate a classification for a labeled object, wherein the classification may be based on attributes.

In some cases, labeling may be performed by layering. Here, layering may refer to all pixels in an image as a main layer, and pixel that share a same attribute as a layer. For example, layering may include multiple layers—each representing a color or a depth range of pixels. As another example, layering may include pixels inside bounding boxes in one layer and pixels outside bounding boxes in another layer, and so on. In some embodiments, a human user may first perform image labeling (e.g., bounding boxes), which may be followed by a machine based labeling. Alternatively, ML based labeling may first be performed, followed by a human user feedback. In some embodiments, a semantic segmentation of images may be performed first. In some embodiments, image regions may be first identified for further processing, and the further processing may be performed only on the identified image regions (e.g., semantic segmentation).

In some embodiments, image labeling may use information associated with images including a location (e.g., GPS location) associated with the image, a time stamp when the image was acquired (e.g., time of the day, relative position of sunlight on the image, etc.). This information may be used as a parameter for training an ML model that performs the labeling.

Real-Time Training

The variety of objects that an ML model may encounter in processing natural images, e.g., agricultural images, is vast. Not only is the number of plant species practically unlimited, but also other natural objects like rocks, mud piles, sand formations etc. may occur in a number of different colors, shapes and sizes. To add further to this complexity, several agricultural objects, such as fruit and produce, look different during various stages of growth and during various times of the day. For example, some flowers open and close in response to sunlight and fruit and vegetables change size and color as they become riper.

One operational challenge presented by such an ever-changing environment of an agricultural use case is the time it takes to train an ML model to perform accurate tasks. For example, a typical agricultural workflow may generate hundreds of millions of images, amounting to terabytes of data, during a typical working day. Because large scale computing resources are typically not available onsite, this data may have to be uploaded to a computing facility where offline processing may be performed (e.g., 1120). The offline computing may include labeling of images, or a subset thereof, identifying images suitable for training, further training of an ML model, and then subsequently downloading the ML model to an in-field ML platform. However, if this training loop takes a few days, it is likely that the flowers, weeds, crop and fruit whose images were used for training the ML model have already grown or become ripe and changed their visual look. In such a case, the changed objects may present a detection problem to the newly trained ML mode.

Therefore, agricultural environment presents a particularly challenging problem to ML based object detection techniques. Due to possibility of errors in identifying agricultural objects, automated agricultural equipment may create operational issues such as improper treatment of desired vegetation or entirely missing certain tasks because objects were not identified or were misidentified. To solve such issues, in some embodiments, ML models may undergo real-time training, among other solutions, as disclosed in the present document. One of the challenges in such a real-time training goal is the amount of data that is produced during the operation of agricultural equipment. For example, 4K images, at 30 frames a second, captured by 8 cameras generates about 6 Gigabytes of uncompressed image data per second. The present document discloses techniques that may be used to selectively reduce the amount of data used for real-time training by a considerable amount, e.g., few images (e.g., 100 images a day) that the ML detection algorithm deems to be particularly difficult to classify.

Figure 3:
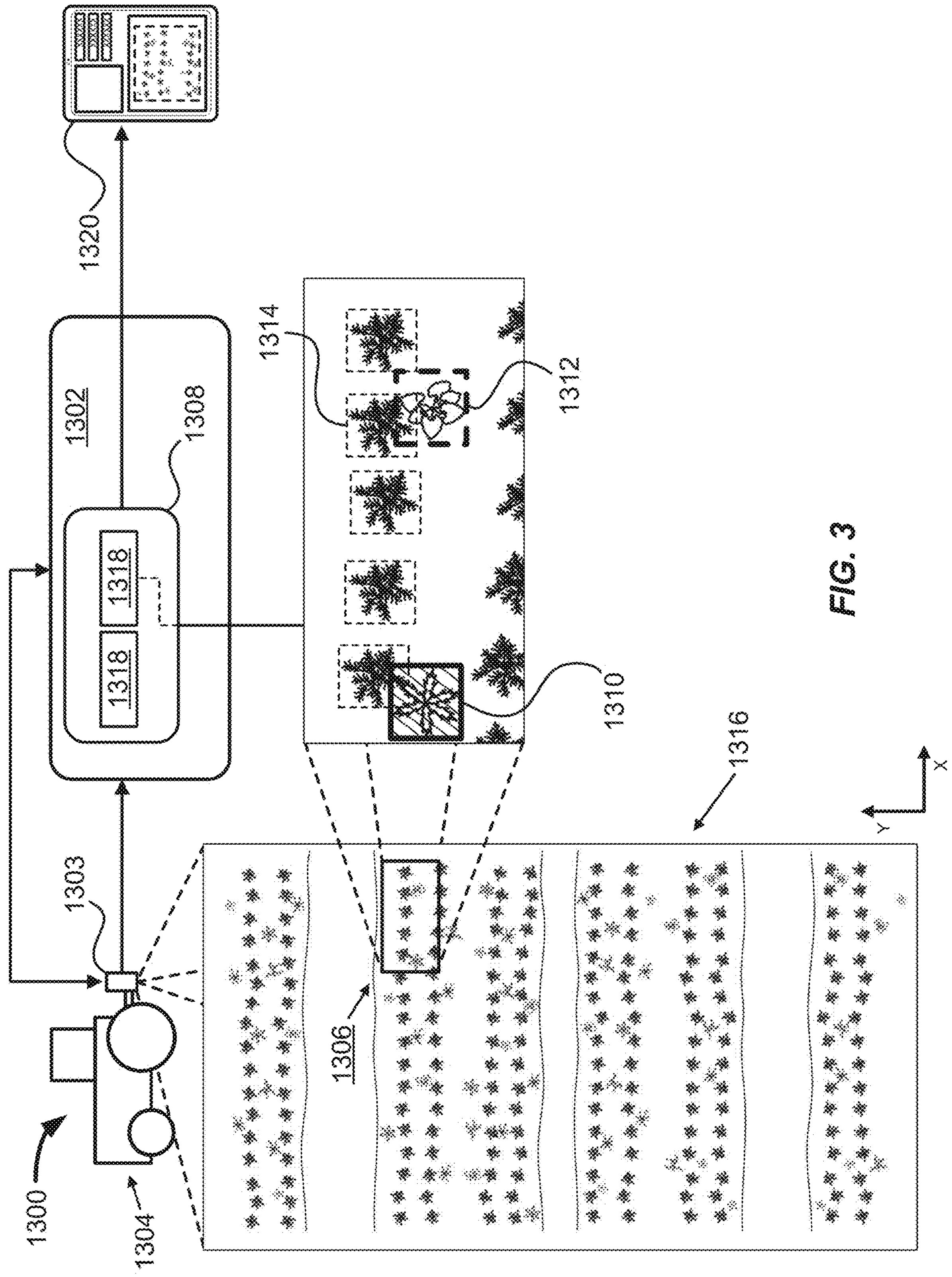
FIG. 3 shows an example system for real-time training of an image processing system.

FIG. 3 shows an example operational setup 1300 in which real-time detection, confirmation, visualization, and further processing, including training, may be implemented. A platform may be installed on a vehicle 1304 and may include one or more cameras that capture images (e.g., image 1306) of a field environment. The image 1306 may include a row of a crop with possible weeds interspersed in between the crop in a real world agricultural environment 1316. A region of this image 1306 is shown in greater detail and having multiple vegetation objects that may be a desired vegetation 1314 (e.g., carrots or another crop) and undesired vegetation such as different types of weeds 1310, 1312. The onsite computer platform 1302, disposed on a treatment system 1303 (which may include modular components) may include a compute unit 1308 which may perform image classification/segmentation using various image processing algorithms 1318 which may include one or more ML models.

As disclosed in the present document, various strategies may be used to separate out the weeds 1310, 1312 from the desired vegetation 1314, including using of color information, depth information, background-foreground separation, computer vision, ML models, and so on. The detected objects may further be annotated using an action performed. For example, solid boundary around weed 1310 indicates that a treatment was applied to this object, while a dashed boundary around weed 1312 may detect that no treatment was performed to this object, while light dashed boundary around objects 1314 indicates that this was classified to be desired vegetation.

An object such as the weed 1312, which was detected as an object, but not with such a confidence to take a specific action on the object, may be alerted for user input or labeling in real-time. For example, an image, or a portion of the image that includes the object, may be sent to a user interface of a field-deployed unit, for example computing device 1320, and/or further be sent to the offline computing platform 1120 for labeling, user feedback and ML training in real-time. In one example, an ML model or algorithm (as described in this disclosure) can be configured to perform object detection with multiple attributes. In one example an object detection can include one or more of a 1. detection that a portion of an image includes an object and a confidence level associated to the detection, 2. the pixels associated with the object detection, 3. the identification or class of the object (there being a plurality of classes including species of plant, landmark, state of object, phenological stage of plant, etc.), 4. the confidence level associated with the classification, or a combination thereof.

Figure 4A:
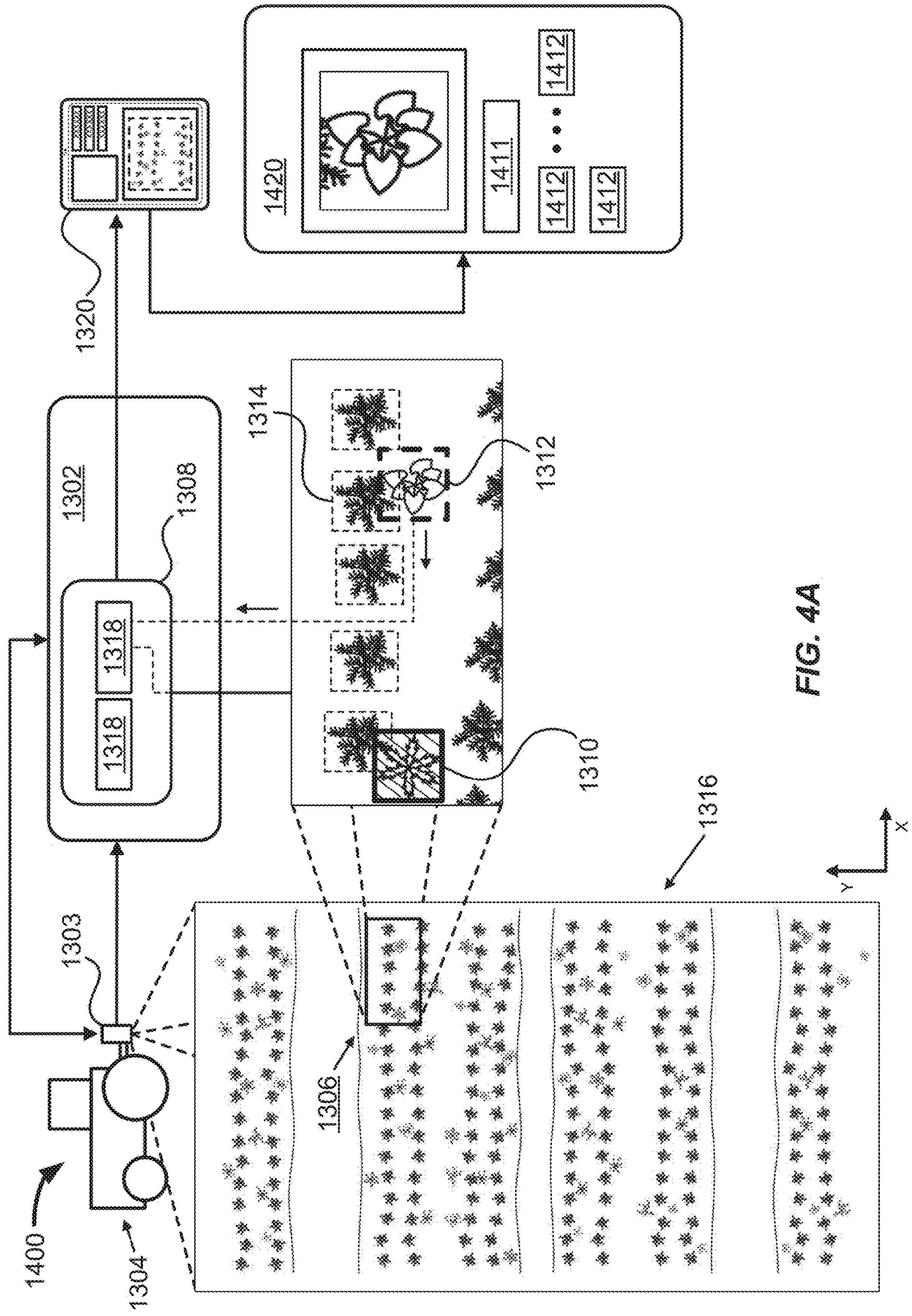
FIG. 4A shows an example configuration of an agricultural image processing system.

FIG. 4A shows an example configuration 1401 in which a particular image region 1312 is displayed on the computing device 1120. In addition to displaying the image, the user interface may include additional information such as a label 1411 that may indicate a type of object detected by the processing. Examples of such a label may include "weed" "vegetation" "soil" or "nothing." Alternatively, or in addition, specific types of weeds or vegetation (e.g., carrot leaf, cabbage, etc.) may be indicated. The user interface may further include additional information fields 1412 that provide further insights into the image analysis algorithms. Such information may be useful for ongoing monitoring of effectiveness of the system operation, auditing and training purposes. Information fields 1412 may provide information such as a confidence level, coordinates of the object, whether this is a new object or a previously seen object, and so on. In another example, information fields 1412 can be selectable by a user to input feedback, which itself can be an event or determination by the user. For example, the compute unit 1308 can detect an object, the object being a certain species of plant type or plant classification. The object can be displayed on user interface 1420 with a determined label 1411 determined by the compute unit 1308. If the user determines that the classification of the objected detected by compute unit 1308 is incorrect, the user can select an alternate classification, among a list of selectable classifications. In one example, the information fields 1412 are selectable classifications. In another example, the compute unit 1308 can make an inference on a given image 1306 by drawing a bounding box (or generating a bounding box) over a portion of the image that includes the detected object, for example a vegetation object 1310 or 1312. In one example, the while the object detected may be correct, the bounding box size is not optimized. In this case, a user can view the specific bounding box generated by the compute unit 1308 and input feedback and/or give an evaluation of the inference made by the compute unit 1308. For example, the user can select an information field 1412 that indicates that the bounding box is oversized, does not cover a portion of the object in the frame, or a combination thereof. In another example, the user, via the computing device 1320 can interact with the user interface 1420 and draw the correct bounding box (correct being that whatever the human draws is considered the correct bounding box, and can be used as the ground truth bounding box for further training) and the treatment system 1303 and other databases can receive and log the selection and interaction by the user. In this case, drawing bounding boxes is only one of a plurality of examples of a machine learning algorithm of a compute unit performing object detection in a given image frame. Other examples can be performing pixel segmentation, instance classification, segmentation via superpixels, and the user feedback via computing device 1320 can be that of confirming or correcting segmentation, classification, etc. determined by the compute unit.

In one example, only detections below a certain threshold will be sent to a computing device for further analysis, including user feedback and analysis. In one example all detections of a certain classification or classifications (no matter the confidence) can be sent, in real time to a user for feedback (whether the user interface is requesting a confirmation, a correction, an optimization (that is drawing or labelling a better bounding box despite the machine learning model or algorithm detecting and labelling the correct pixels associated with the correct object identity, but not necessarily the best fit box), or a combination thereof.

Figure 4B:
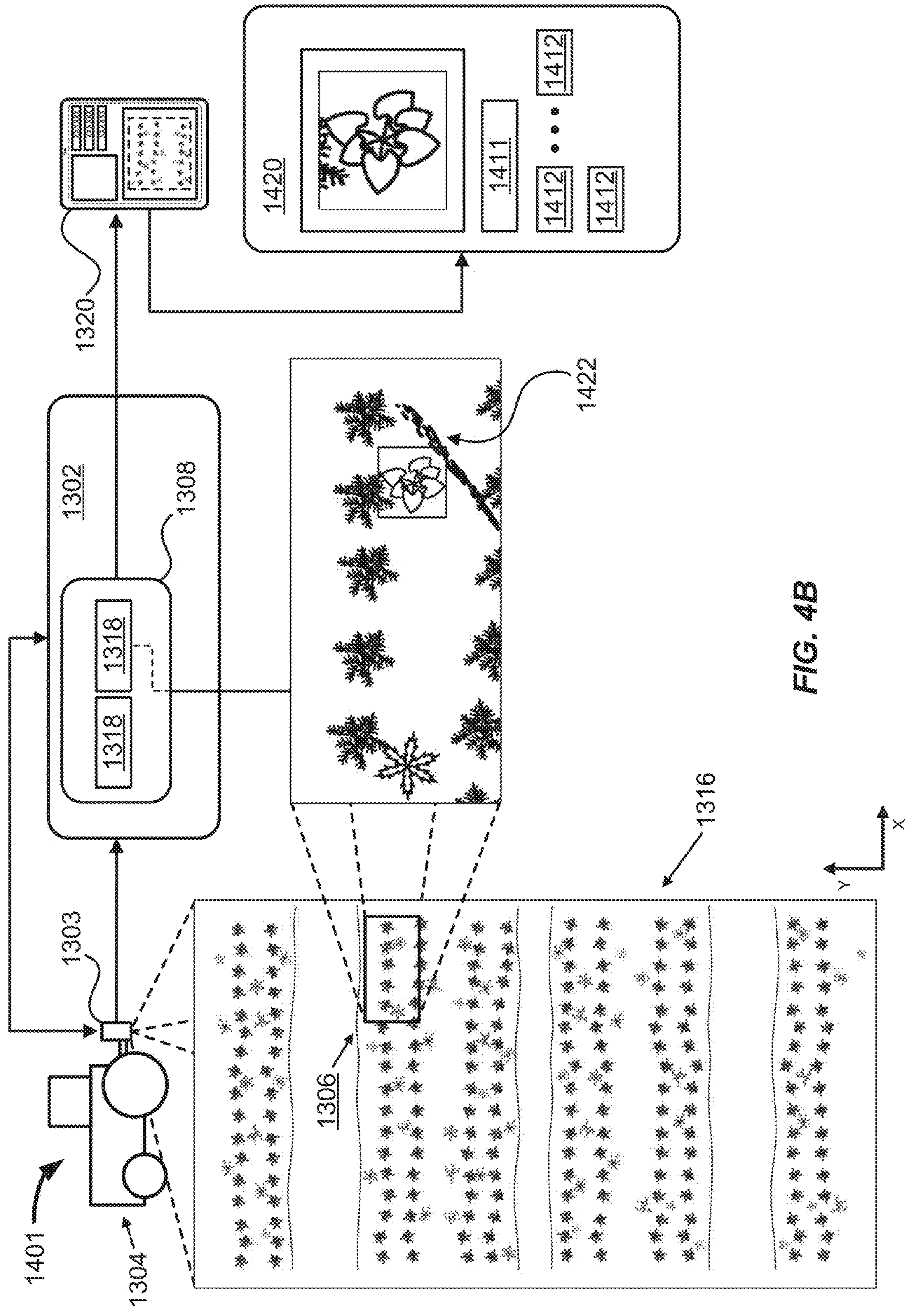
FIG. 4B shows another example configuration of an agricultural image processing system

FIG. 4B shows another configuration 1402 in which images obtained from sensors include an indication of a treatment action 1422, as shown by the image portion 1307, which may be a frame captured by the compute unit 1308 subsequent to the frame used by the compute unit to detect vegetation object 1312. In one example, the treatment action 1422 is detected by the presence of multiple consecutive images such that comparing a frame that does not have pixels associated with a liquid to that of a frame that does have pixels in the frame associated with a liquid is used to determine the presence of a projectile being emitted towards a target. In some embodiments, one or more sensors may be directed towards the target objects to which a treatment is applied. The one or more sensors may be controlled to capture images during a time interval in which the treatment action is expected to occur. The treatment action may typically be transient and much smaller in pixel width than other agricultural objects. For example, a treatment action such as a pesticide squirt or a laser beam may be approximately 5 to 50 pixel wide, and may in 1-10 consecutive images, which typically is less than a number of consecutive images in which other agricultural objects such as weeds and crop may be present. The treatment action can be that of a liquid-based projectile detected by the treatment system 1303 or the result of a liquid-based treatment onto a plant object or a ground region including a splat (a splat being a liquid projectile impacting a surface), where the splat is detected by determining a change in color of the ground or a plant. For example, a liquid impacting the ground will change the color the ground detected by the image capture device. The image capture device can then determine that a color change is the result of a liquid-based projectile, spray, or spray action impacting the ground or plant object near the detected color change.

Figure 4C:
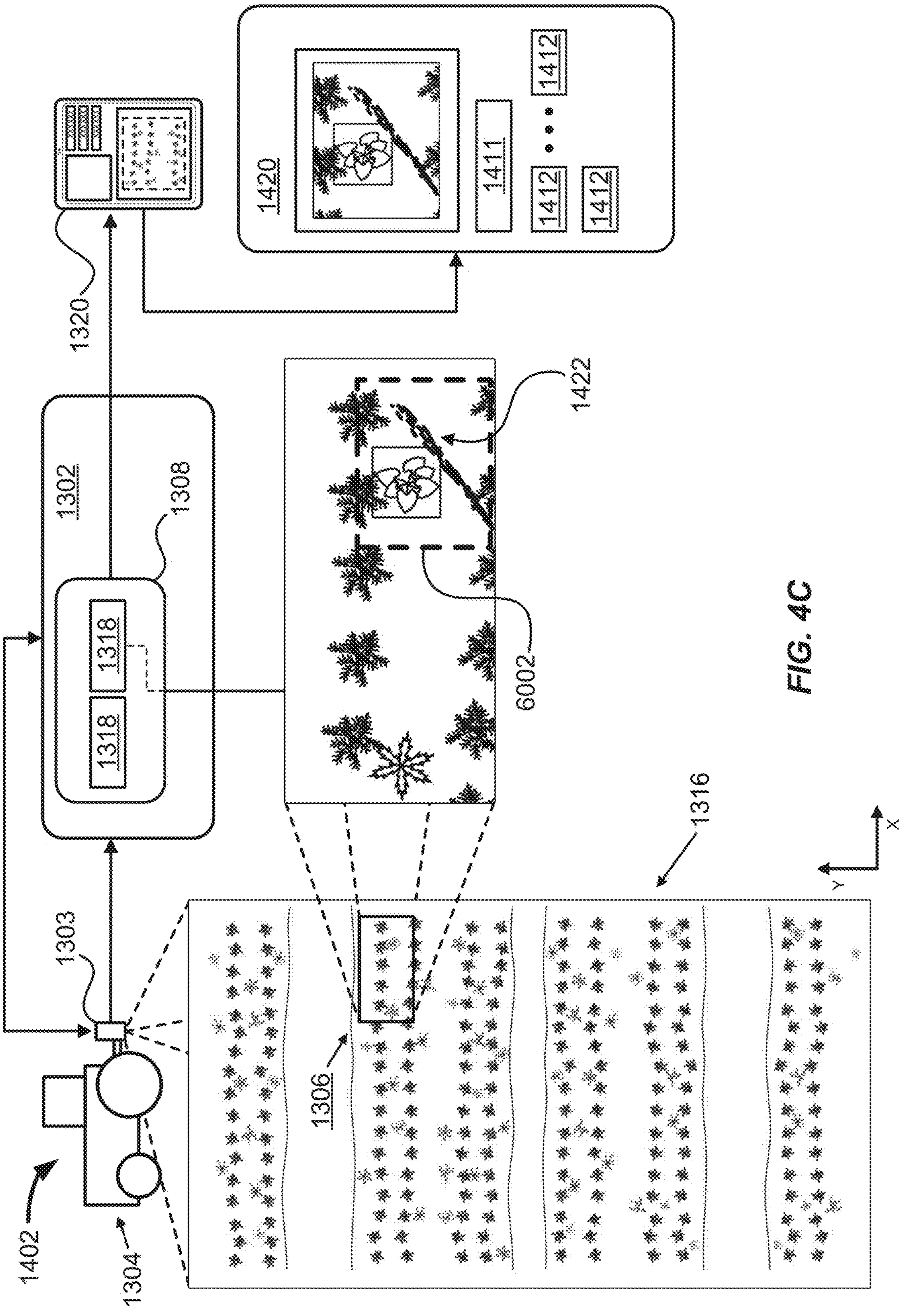
FIG. 4C shows another example configuration of an agricultural image processing system

As shown in the configuration 1402 in FIG. 4C, the image portion 6002 in which the treatment action is detected may be sent to the computing device 1320 for auditing, training and feedback purpose. In this example, multiple consecutive images are captured and/or cropped from larger images captured and sent to the computing device 1320 for analysis. The corresponding label 1411 or 1412 may indicate information about the detected treatment action, an estimate of its effectiveness (e.g., whether the treatment action actually effected the target object), etc. In some embodiments, the user interface may allow a user to play a closed loop video of the consecutive frames to be able to visually see the occurrence of the treatment action. In one implementation, all intended spray events are set to computing device 1320 whether the platform has detected a spray. That is, as long as the treatment system 1303 instructs a component of the treatment system 1303 to emit a liquid-projectile, the onsite compute platform 1302, via the compute unit 1308, can send a series of images, a video, or a similar file format (such as a graphics interchange format (GIF)), of a portion of a series of images captures that are expected to show a treatment action. For example, if the treatment system 1303, sent instructions to fire a liquid projectile at detected plant object, the expected series of images or portion of images that captures the treatment action or the projectile firing and impacting the plant object will be displayed to a user via computing device 1320 (the computing device may be physically located near the supposed treatment action or a connected to the onsite compute platform 1302 from a cloud or fog network to evaluate performance of the treatment system 1303 and any related agricultural functions in real time). In one example, if the user using the computing device 1320 does not see any treatment action, such as a liquid projectile or a spray impact on a plant object, the user can then determine that a spray action did not occur and select or input such determination into the computing device 1320 for further analysis. In this example, the treatment system 1303 may have intended for a component to activate and emit a liquid projectile at the target, but due to internal factors, such as the system losing track of the location of the object after determining the location of the object in a given frame, none of the treatment units were finished with their current task, so none of the treatment units were selected to fire, even though the treatment system 1303 intended to select a treatment unit. In another example, the treatment system 1303, via one of its component treatment units did in fact emit a liquid projectile but aimed at the wrong object, or unintended region of interest, such that the images associated with the predicted location of the impact was captured and sent to computing device 1320. Each of these examples are a way for a user to determine that there was a misstep from the moment the treatment system 1303, via a detection (whether valid or not) by compute unit 1308, determined and generated an instruction to spray the detected object, such as vegetation object 1312, but due to systematic reasons, the spray either does not happen, or completely misses the intended target object (vegetation object 1312) and does not show up at all in the image portion 6002 (which includes a series of images capturing image portion 6002 in multiple consecutive frames), to the system actually emitting a projectile at the intended target. And in some of these above examples, a user will see a series of images where there is no spray at all, and the user can select and determine that the spray either happened but completely missed the intended target, or spray did not get emitted from the treatment system 1303 at all.

In another implementation, a spray action can hit the target, miss the target (but the spray action itself still captured by the compute unit 1308), overspray the target, such that the target is impacted, but so is an unintended nearby region of the target object, for example if another plant object is also impacted or if less than a certain amount, the certain amount being programmable by a user, of splash detected covers that of the target object. These determinations can all be selections on the computing device 1320 via the interface 1420. And the selections can be the information fields 1412. For example, the information field 1412 can include selectable inputs representing confirmation of good target intercept, partial intercept, near miss, complete miss, overspray, bad (wrong) target, confirmation of intercept but towards the wrong target, overspray such that the projectile correctly intercepted the target but also hit a target that was not supposed to be sprayed or treated. In another example, the user can determine that the inference determined by the compute unit is not accurate, or at least not optimal, and the user can fix or input the correct or optimized label to the detected object. For example, a user can be displayed with an image patch that includes a weed object and background. The bounding box around the weed portion is not optimized. In this instance, the user can select a field 1412 which indicates that the bounding box is incorrect or not optimal. Additionally, the user can, via the user interface 1420, draw the correct bounding box and label the object. The user-labelled bounding box and object classification (the classification of the object inside the labelled bounding box) can then be used as ground truth for further analysis including metrics analysis of treatment performance by the treatment system 1303 or for further ML training.

Figure 4D:
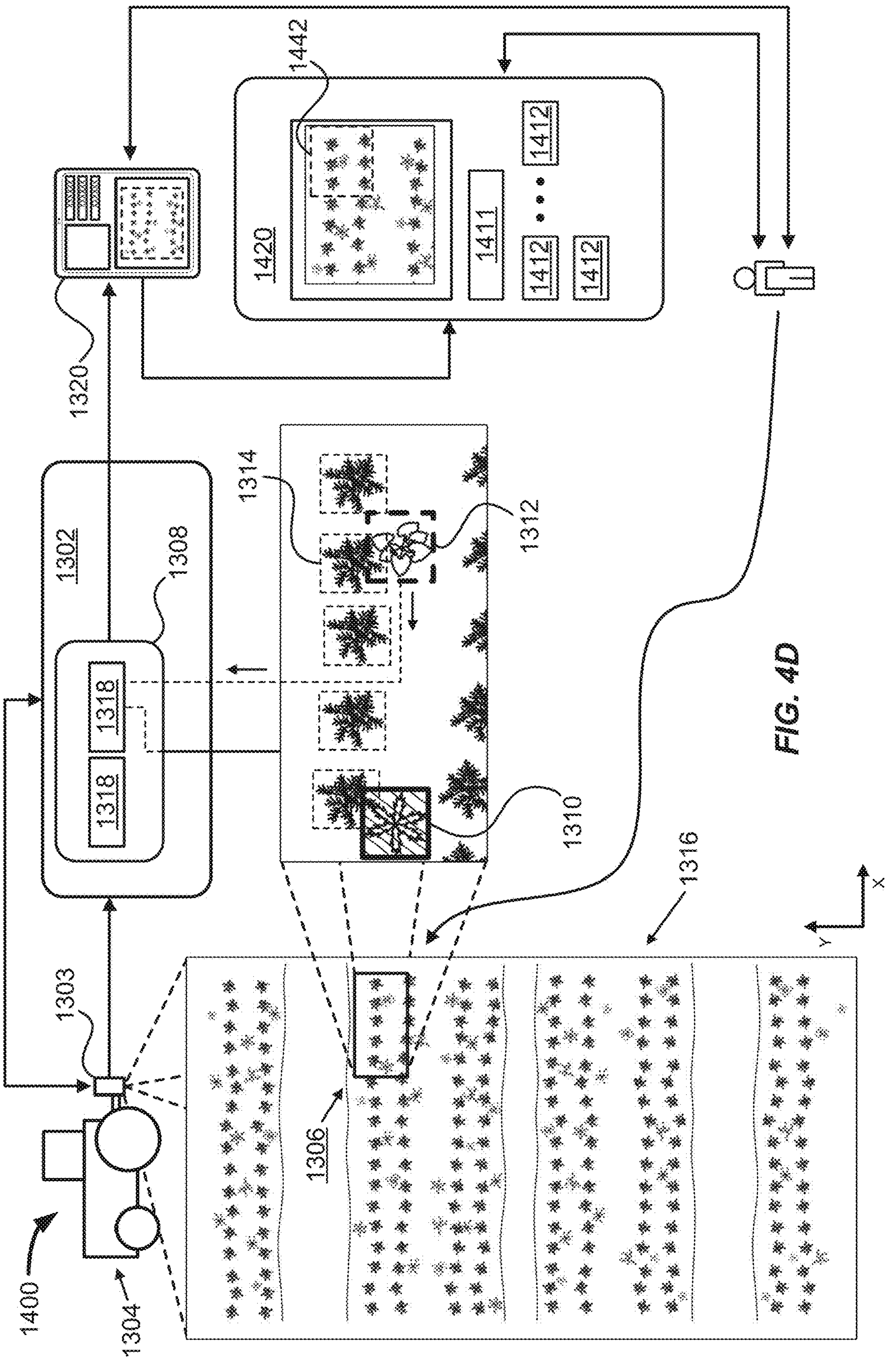
FIG. 4D is a flowchart of an example method of processing agricultural images.

FIG. 4D shows another operational workflow similar to the workflow described with respect to FIG. 3. Unlike FIG. 3, in the workflow depicted in FIG. 4D, the detection of an object for which next action is uncertain triggers an alert on a user interface which prompts a user to physical go to the location where the object was detected to inspect what type of object it was. To assist this workflow, the user interface may display a position, e.g., a geographic location marker for the object. For example, a user may be able to use a software installed on the computing device 1320 to track images taken by a camera on the computing device 1320 to ascertain whether the user is going in the correct direction in the field towards the object that is to be manually inspected. The user interface may further present a dialogue menu to the user to allow the user to confirm that the user has located the object, inspected the object and has determined a classification and/or any attributes of the object. Upon receiving the confirmation on the user interface, the image may be labeled accordingly, and the ML model may be trained to use the newly acquired information.

In some embodiments, the above-described workflow may be used to perform data gathering in the field based on a certain selection criterion. For example, a farm equipment may be deployed in a field to take images, detect object in the images in real-time, and present detected objects that meet a certain selection criterion on the user interface. Alternatively, objects that do not meet a certain criterion may be presented on the user interface. For example, in some embodiments, the images captured during a field run may be analyzed to detect locations of weeds. At the end of the field run, an image of the farm may be displayed on the user interface to indicate weed locations. In some embodiments, only weeds that are too close to a crop for automated spraying may be displayed (e.g., within a pre-configured distance according to target accuracy of the spraying mechanism on the agricultural platform). In some embodiments, only vegetables, flowers or fruit that are ripe and ready to be picked may be displayed. In some embodiments, unknown vegetation that the ML detector is not able to discern and thus needs user feedback may be displayed. These are just some examples of the criteria by which an ML model may be trained to detect objects and present to a user. In some cases, the ML detection may be followed by a certain automated action by the farm-deployed equipment, e.g., treating a detected weed with a pesticide or a laser beam etc.

Figure 5:
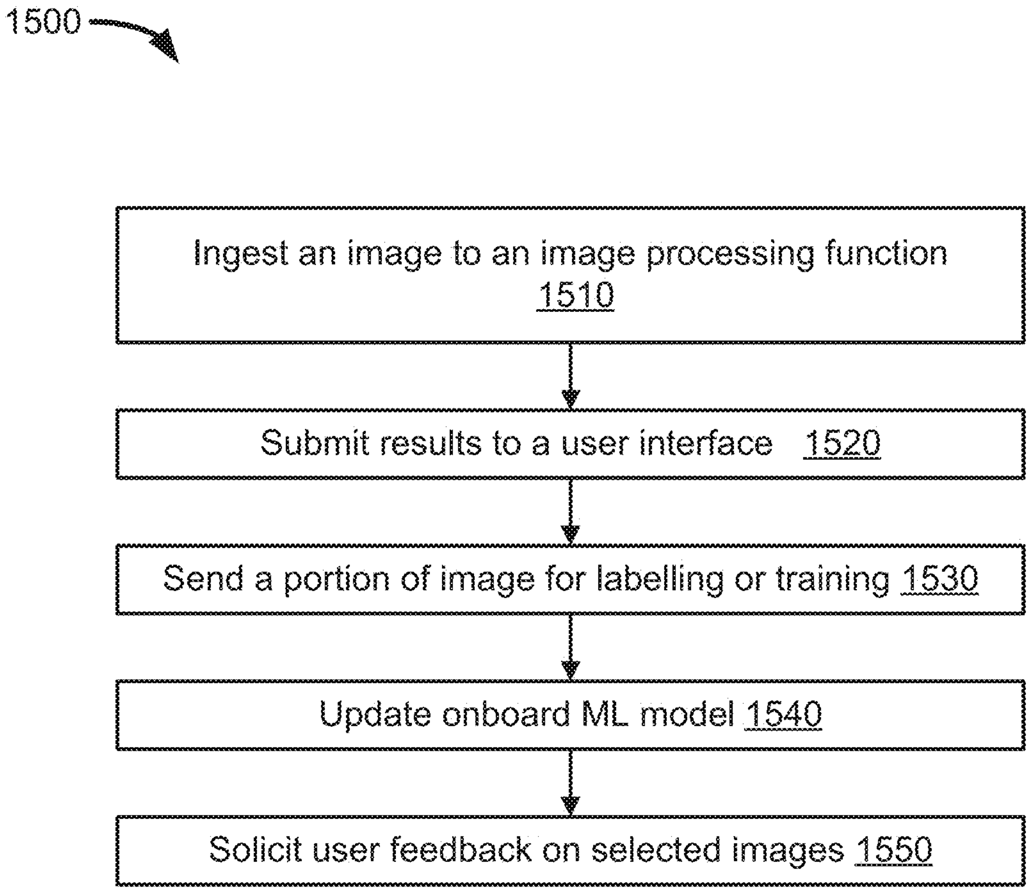
FIG. 5 is a flowchart of an example method or real-time training of machine learning algorithms for agricultural image processing.

FIG. 5 depicts an example flowchart of the workflow for real-time training. The general workflow may include obtaining or capturing an image, ingesting the image to an image processing function (1510) for real-time action and noticing one or more object for which a further action is needed, e.g., because the machine does not understand the object, or the machine has been instructed to identify and flag such objects to a user. At 1520, the objects and/or images resulting from 1510 are sent to a user interface of a device such as a portable computer or a tablet that may be present in the field. At 1530, either the entire image or an image portion that includes the objects of interest may be sent for further action such as labeling and training of objects that the machine was not able to identify. As a result of the labeling and training, the onboard ML model may be updated in real-time (1540). In particular, the number of representative images that are selected for training and labeling (1550) may be significantly fewer than the total number of images captured (e.g., 0.1 percent or fewer of all images). In some embodiments, a user may be prompted to perform a specific action such as identifying the objects in real-world to provide a user feedback that may be used for the labeling/training (1550). In some embodiments, for resource efficiency, the solicited feedback may be only requested for a subset of images (e.g., every Nth image). In some embodiments, a user confirmation that the requested action was performed may be solicited for the completion of real-time training and detection.

Multi-Model Training

Figure 6:
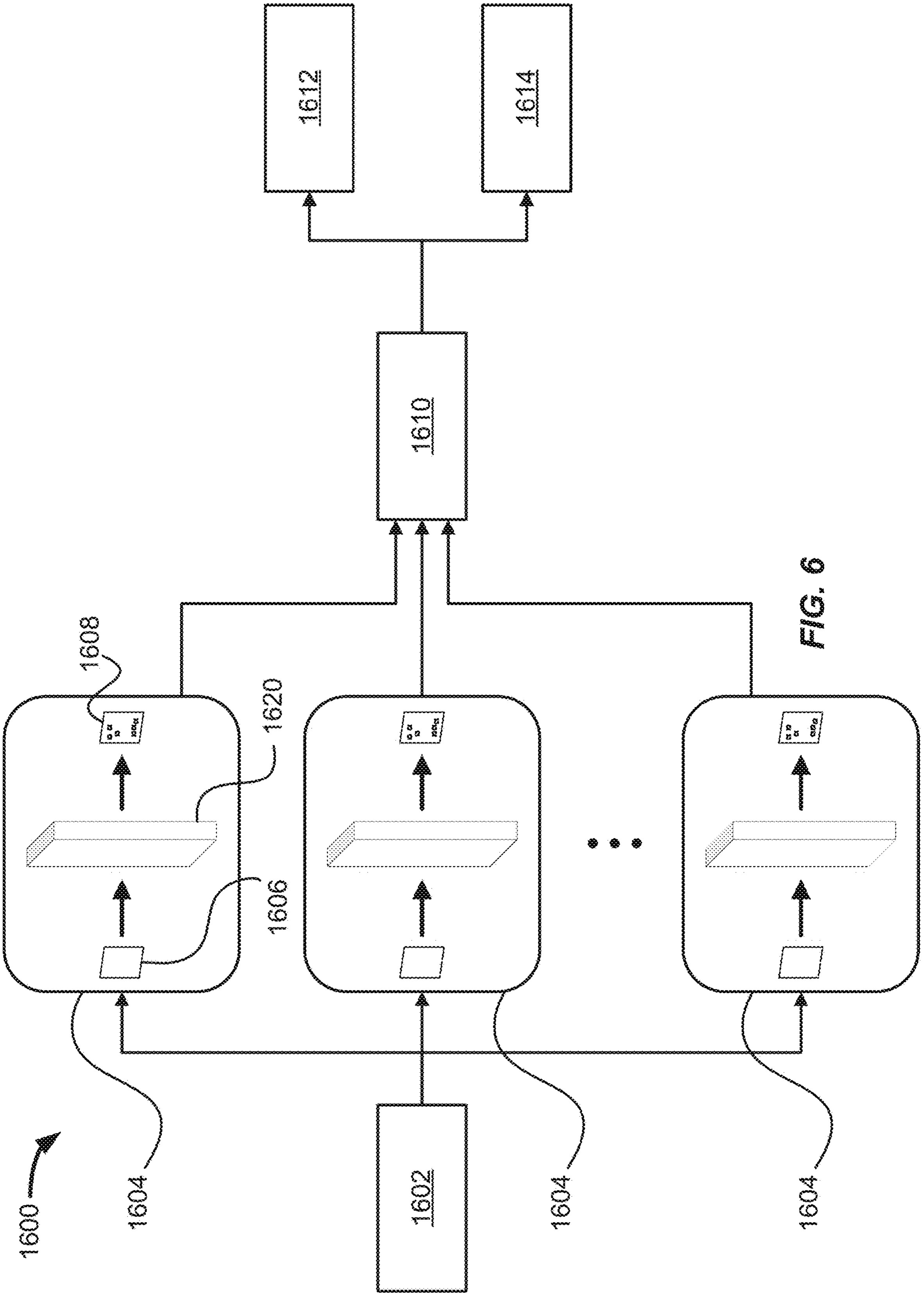
FIG. 6 shows an example of a multi-model ML system for processing of agricultural images.

FIG. 6 shows a scheme 1600 of benefitting from multiple ML models (1620) and performing training of the multiple ML models. Images 1602 may be ingested by multiple ML detectors 1604 that are configured to perform ML detection on multiple images 1606 to produce labeled output images 1608. Labeled image outputs from same images processed through multiple ML models may be provided to a verification stage 1610 as a super-labeled image that includes labeling performed by different ML models for a same image.

In some embodiments, a differential comparison of various ML models may be generated at the verification stage 1610. For example, one attribute of the comparison may be to highlight all objects that are commonly identified by multiple ML models as being a same type of object. Another attribute of the comparison may be to highlight objects that are differently identified by different ML models. For example, the various ML models may include and ML model ML1.0 and another ML model ML1.1 that is obtained after training ML1.0. In some embodiments, objects that are additionally identified by ML1.1 compared to ML1.0 may be highlighted. This may advantageously show to a user the way by which training of the ML model is progressing. For example, in one example, there may be total 500 weeds in an image. ML1.0 may identify 400 weeds, while ML1.1 may identify 450 weeds. A user may note that, of the 450 weeds identified by ML1.1, some weeds are identical to those identified by ML1.0, while some weeds were missed by ML1.0, and some weeds were missed by ML1.1. This may provide additional input to further training. For example, ML1.1 may miss weeds that present themselves with certain visual attributes such as longer leaves, or browner color or higher height, etc. The verification stage 1610 may identify ground truth objects detect in the images, typically objects that are commonly detected by all ML detectors, and feed them to a training stage 1612 for further training of ML models.

It is noted that the various ML models depicted in FIG. 6 may be different versions of the same ML model as it gets trained and/or different ML models. For example, different ML models may be constructed using different hyperparameter that map to different object attributes. For example, one ML model may be designed to identify certain types of weeds, another ML model may be designed to identify certain type of desirable vegetation and classify everything else as a weed, and so on.

In some embodiments, a computer-implemented method of sensor input processing, for example using the techniques described in FIG. 6 includes receiving sensor input from the sensor; processing the sensor input by multiple machine learning (ML) algorithms, each using a corresponding ML model for generating labels for objects identified in the sensor input; combining labels generated by each ML algorithm to generate a super-imposed labeled sensor input frame, comparing outputs of the ML algorithms to determine similarities or differences; and using results of the comparing for improving an operational characteristic of the sensor input processing.

In this method, the operation characteristic may be improved by performing further training of one or more ML models using the super-imposed labeled sensor input frame and/or the similarities of differences in outputs of the ML algorithm or by other offline means. In some embodiments, the ML models include ML models that are based on different sets of hyperparameters. In some embodiments, the ML models include ML models that are different versions of a same baseline ML model that has undergone different training. In some embodiments, the further training is performed based on user feedback on the super-labeled sensor input frame. In some embodiments, the method further includes generating an ML performance metrics based on the comparison of outputs. In some embodiments, the method further includes presenting the ML performance metrics on a user interface. Such a presentation may facilitate diagnosis by a human user of the effectiveness of the agricultural operation performed using the analysis of the sensor inputs.

Figure 7:
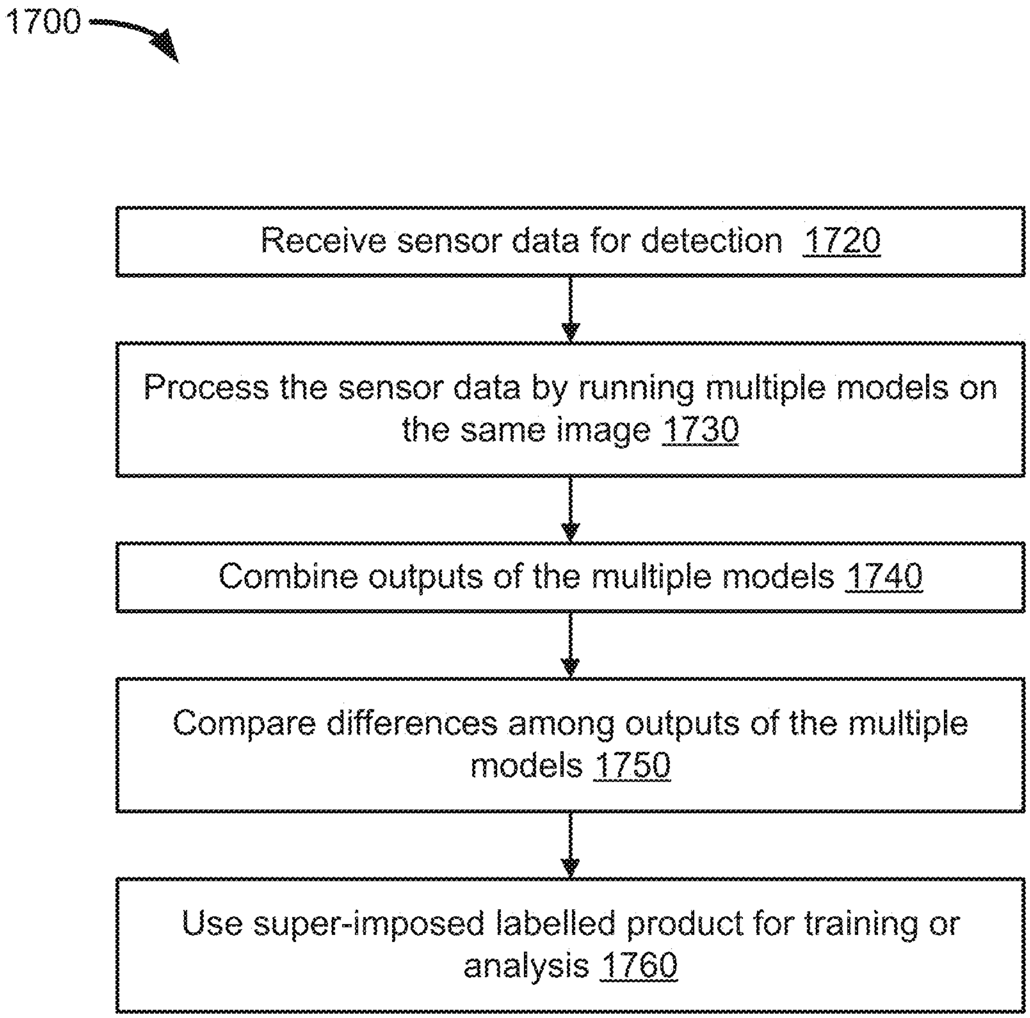
FIG. 7 is a flowchart of an example method of multi-model training.

FIG. 7 shows an example process 1700 of multi-model training. Multiple images or image portions (patches) may be received by the multiple ML models (1720). The multiple ML detectors may be run on the received image portions (1730) using ML models that are different models (e.g., different hyperparameters) or updated versions of a same baseline model). The resulting labeled images may be combined (1740) into a super-imposed labeled image. Differences and/or similarities of ML detections may be compared at 1750. The super-imposed labeled images may be used for further training (1760) with or without additional user feedback. The super-imposed labeled images may also be used to understand the progression of ML updating. A visualization may be generated, e.g., a heat map showing similarities and differences among various models.

Example Embodiments of Layered/Cascade Processing

Figure 8A:
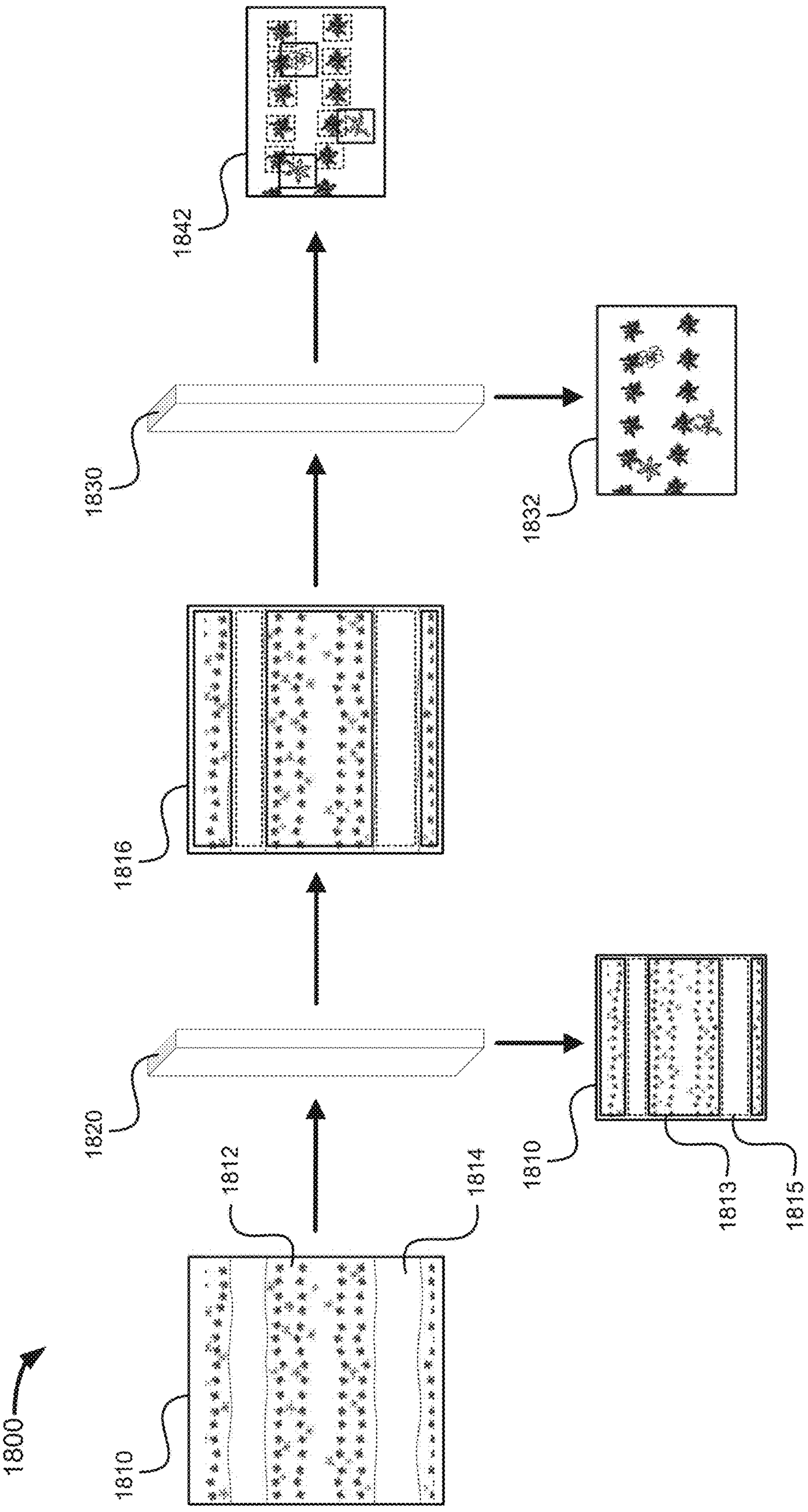
FIG. 8A shows an example of a multi-layer image processing system.

FIG. 8A illustrates an example diagram 1800 for ingesting an image, performing various computer vision and machine learning algorithms onto various portions or layers of the image to extract and detect features of the image.

As disclosed in the present document, multiple image processing algorithms can be applied in layers to the same or portions of the same image. For example, an image 1810 can be acquired by an image capture device and loaded onto a local compute unit of agricultural platform. For illustration purposes only, the image 1810 captured can be an image of a row crop farm having one or more beds 1812 supporting a plurality of crops, such as carrots, and weeds, and one or more furrows or tracks 1814 for a vehicle's wheels to run through as a vehicle passes the row. One or more ML algorithms and computer vision (CV) algorithms in the compute unit, or accessible by the compute unit in real time via the cloud or edge compute device containing the machine learning algorithm and computer vision algorithm, such as CV algorithm 1820 and an ML algorithm 1830 can be used to partition the image 1810 into analyzed images with features extracted, with the goal of accurately detecting objects in the given image 1810. For example, the first CV algorithm 1820 configured to separate beds and furrows can be applied to the analyze and segment classify the image 1810 with portions of the image related to beds such as partitioned image 1813 with portions of the image related to furrows such as partitioned background image 1815. One purpose of deploying this technique is to that the treatment module does not have to run an ML detector on the entire image 1810, but only on portions where object of interest may be. The partitioning of beds and furrows, as is the partitioning of green and background, are just many examples of performing a plurality of computer vision and machine learning techniques to an image to reduce computation load while generating accurate detections of features in the real world. Next, the system will have generated a partitioned image 1816 having pixels associated with beds and pixels associated with furrows such as that of partitioned image 1813 and partitioned background image 1815. The ML algorithm 1830, which for example can be a machine learning algorithm to detect plant objects of interest, such as crop plants and various species of weeds, can be implemented to further analyze the image 1810 or the partitioned image 1816, and only the portion of the image 1810 that is partitioned image 1813, and not the partitioned image 1815. This would allow the ML detector or machine learning algorithm 1830 to analyze fewer pixels or tiles of pixels, and reduce the load on the system, while the system having a high probability that the machine learning detector is scanning the most important areas of the image 1810. In this example, the detector would run detections on only a portion of the partitioned image 1816, for example a portion of the partitioned image 1813, such as a patch 1832 of the partitioned image 1813. The treatment system can then draw bounding boxes, semantically classify, or perform various machine learning methods deployed by machine learning algorithm 1830, for example detect objects and draw bounding boxes, and generated a machine labelled or machine detected image 1842, which is a labeled of image of a portion of the original intake image 1810. The agricultural observation and treatment system can then use those detections to determine which detections are target objects to treat, target the objects in the real world, track the detected objects in subsequent frames, and perform a treatment action to the detected object in the real world. Additionally, using multiple layers of computer vision and machine learning algorithms to optimize the computing load onto a compute unit can be performed to improve Visual Simultaneous Localization and Mapping VSLAM. For example, vegetation segmentation can be performed to detect green objects. In the VSLAM pipeline for matching keypoints from frame to subsequent frames by the same sensor, the compute module or compute unit associated with the sensors receiving the images, can determine that points associated with green objects are real objects in the world that are stationary and can be tracked via VSLAM by sensors and compute units of each component treatment module for local pose estimation. This would allow the VSLAM algorithm to analyze keypoints, keypoints in this case being points related to corners or contours or edges of green objects, with higher confidence that the keypoints generated and analyzed are higher quality than that of arbitrary salient points, compared to that of known objects, such as objects corresponding to green pixels, since the system will know beforehand that green pixels are of vegetation, which are physical objects in space that are stationary and are of similar size and topography as that of target objects for treatment that will be tracked.

Figure 8B:
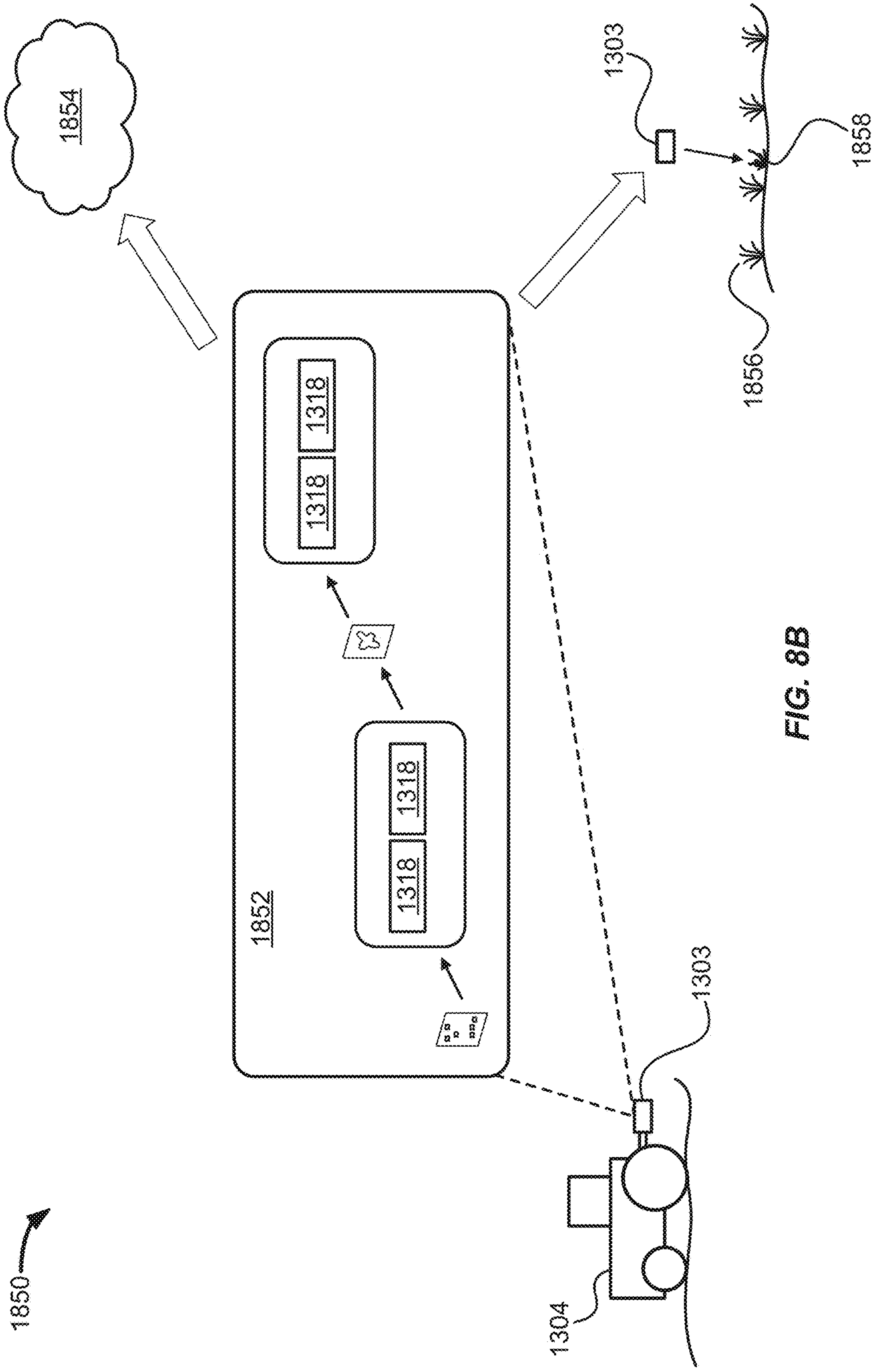
FIG. 8B shows an example processing scheme of agricultural sensor input at different levels of detail.

FIG. 8B shows another example embodiment which shows processing of agricultural sensor input at different levels of detail. As depicted in the flow of process from left to right, initially the treatment system 1303, on the agricultural vehicle 1304, ingests an image. The treatment system 1303 may be configured with a compute module 1852 configured to implement a first ML model that performs object detection via a first ML algorithm, including that of image processing algorithm 1318, for example. The ML model is trained to detect objects on a greater level of detail than a subsequent processing stage. The image resolution handled by the first ML may be from a plurality of resolutions ingested such as 4 k, 1000×1000, 1000×640, 768×768, etc. After the first ML (ML1) detects regions of interest where objects are detected, these regions may be cropped (which itself is a small image) and may be fed into a second processing stage in the compute module 1852. Here, a second ML model may perform instance classification, e.g., given an image, determine a type of object that the image represents. In some example, the images ingested by the treatment system 1303 can be native to 50+ Megapixels, 100+ Megapixels, 200+ Megapixels of which an ML detector can be configured to perform object detection on the image, either at the native resolution, a downsampled resolution, or a portion of the image.

In some embodiments, the second ML model 2 (ML2) may be a better classifier of objects. For example, ML model 2 may be trained to operate on a 3000 pixel region to provide a binary result about whether the pixel region belongs to a particular object such as a weed or a crop. In some embodiments, the ML model 2 may be trained to provide a result that the detected region includes a weed or a crop or soil or other pattern. In some embodiments, where the first image corresponds to a 3 ft×2 ft area of soil at 8K resolution, the 30×30 pixel image may correspond approximately to a 4 mm×4 mm real world dimension. In another example, the first ML model can be implemented on a downsampled native image to perform object detection, and the second ML model can be implemented on the native image patch detected by the first ML model, such that the area of the of the image analyzed by the first model of the downsampled image is the same area as that of the native image used by ML model 2 to perform instance classification.

In some embodiments, both ML1 and ML2 (which are ML models, ML algorithms, ML algorithms configured to run ML models, ML algorithms configured to output ML models, or a combination thereof) may be trained on same underlying resolution, except that the training image size used may be different for the two models (e.g., 768×768 for ML1 and 30×30 pixels form ML2). In some embodiments, ML1 may be trained using a reduced detailed version of the original image—e.g., a downsampled resolution version or only one color or a reduced number of bits per pixel version, compared to ML2, which may be trained on a smaller sized full resolution image portion.

In some embodiments, the agricultural objects of interest may include multiple different object types such as different types of crops, different types of fruits, flowers, weeds or soil in different conditions. Upon execution, ML1 may provide an indication for type of object or identify a specific type of object and provide a decision confidence level.

In the subsequent processing stage, ML2 may provide an outcome of its analysis. The results from ML1 and ML2 may be further used for agricultural operations using one or more of the following manners:

A. If there is disagreement between the object identified in ML2 from the object detected in ML1, then the objects or the corresponding image regions for which such a disagreement occurs may be uploaded via a network connection 1854. In some embodiments, the image region where conflicting results were found may be corrected in real-time by a human operator or by another ML model that is trained to resolve such conflicts. In some embodiments, the image portion may be used for further training of ML1 and/or ML2 models.

b. In some embodiments, every weed detection or every object of a particular type (e.g., weed, soil, stage of growth/state of plant (e.g. fruit)), portion of plant that has its own classification, landmark, etc.) may be uploaded for further review/training.

c. In some embodiments, objects detected by meeting certain detection thresholds by ML1 or ML2 may be uploaded for further review/training.

In some embodiments, if ML1 and ML2 provide object detections that are consistent with each other, such objects may be identified as target objects and may be selected for further agricultural operations according to one or more of the following criteria.

1. In one example implementation, ML1 may detect a specific object for treatment (e.g., a weed); while ML2 does not detect this to be an object for treatment, then such as object may not be treated and may be used for further training/resolution. For example, ML1 receives an image with a plurality of agricultural objects, patterns, landmark, and background features in the image. The ML1 detects a first agricultural object of a first classification in a portion of the image. In one example, the first classification is a crop. In one example, the first classification can be a number of different species of weed, each having its own classification. In one example, the first classification can be state of a plant (stage of growth or phenological stage with distinct physical features). In one example, ML2 is configured to perform instance classification among crop species, weed species, and soil patterns. ML2 analyzes the same portion of image labeled by ML1 as a first agricultural object of a first classification and classifies the image. If the classification of the image is the same as the first classification determined by ML1, then both ML models are in agreement, and a further processing can be performed, such as tracking the object and performing a treatment action. If the classifications are in disagreement, in one example, the specific patch or portion of the image can be sent to a user interface via network connection 1854 so that a user can verify the correct classification, input the user's selection or determination of the actual classification, and use the user's determination for further processing including analyzing metrics or further ML training. For example, a treatment system 1303 can ingest a 50 Megapixel image. ML1 can run a detector that analyzes a tile of 768×768 of the 50 Megapixel image. ML1 can detect that a portion of pixels (by a bounding box) of the 768×768 tile of the 50 Megapixel image includes an agricultural object, and determines that the agricultural object in the portion of the 768×768 tile is a weed, for example object 1858 being determined that it is a weed. ML2 can run a detector that analyzes the same portion of the 768×768 tile of the 50 Megapixel image, or analyzing the 50 Megapixel image directly by running a tile of the same size and same location as that of the portion of the 768×768 tile, or ML2 ingests full images (the full image in this case being an image that is the same portion of the 768×768 tile of the 50 Megapixel image), and determine whether the image or portion of the image is that of a weed or another classification. If ML2 determines that the classification is weed, then the treatment system 1303 can be configured to perform a treatment action on object 1858. If ML2 determines that the classification is a pattern of soil (for example the cracks and contours of a soil pattern looks similar to that of the pattern of a plant), then a treatment action will not happen and the portion of image (as an image patch) can be sent, in real time, to a compute device 1320 for review. In one example, ML1 can detect an object with high certainty (above 70% confidence). If ML2 classifies the object detected in the ML1 detector, than a user can analyze the discrepancy between the ML2 classifier and the detected result of the ML1 detector. In one example, any detections above a certain confidence (e.g. over 70% or over 90%), the detection does not get sent to a user or further processing offline for analysis since the confidence is high.

2. 1. In one example implementation, ML1 may detect a specific object for non-treatment (e.g., a crop); while ML2 detects this to be an object for treatment, then such as object may not be treated and may be used for further training/resolution.

In some embodiments, an object (e.g., 1858) may be detected as an object for treatment by both ML1 and ML2. In this case, the treatment mechanism may be activated to treat this object.

In some embodiments, an object (e.g., 1856) may be detected as an object for non-treatment by both ML1 and ML2. In this case, the treatment mechanism may be refrained from activation to treat this object.

Figure 9:
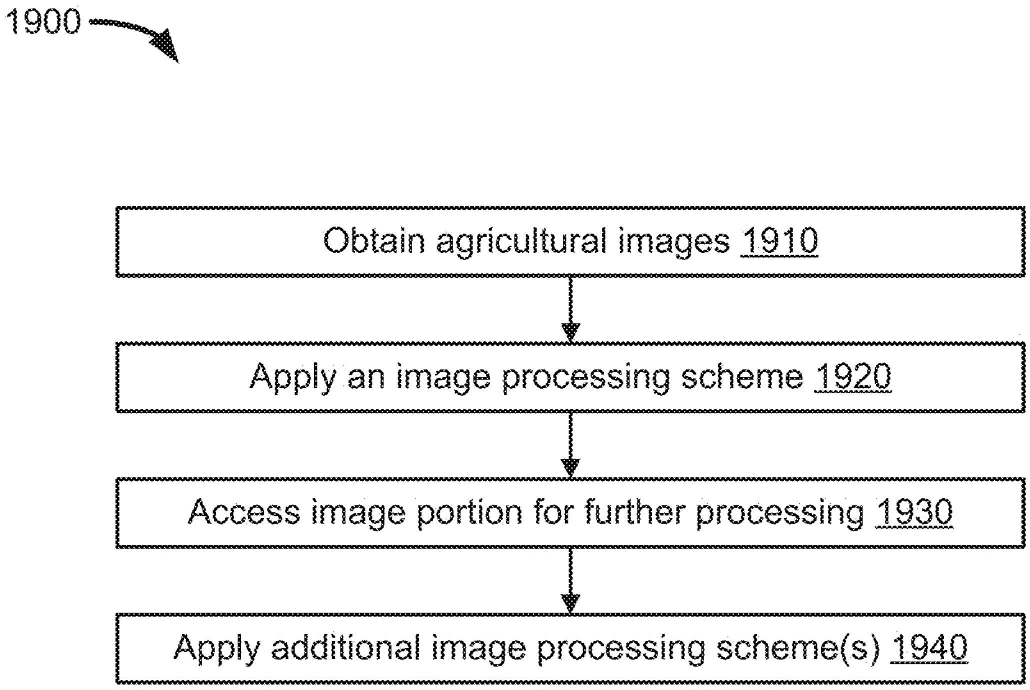
FIG. 9 is a flowchart of an example method of processing agricultural images.

FIG. 9 is a flowchart 1900 of a method of processing of agricultural images. At 1910, images of an agricultural environment are obtained. For example, onboard cameras of an agricultural platform may be used to capture images and store them to a database. A computer platform may then obtain the images from the database. Multiple image processing schemes may be applied to the images as follows. At 1920, a first image processing scheme may be applied to the images. The resulting outputs may provide agricultural images from which certain pixels or pixel regions may be eliminated from further processing (1930). For example, certain pixels or pixel regions may be identified as background (e.g., ground, rocks, or other object that are not of further interest) and may not be further processed. At 1940, one or more additional image processing schemes may be applied to the simplified, reduced images output from the first image processing scheme. For example, the first image processing scheme may be a CV algorithm, while the second image processing scheme may be an ML detection algorithm. In some embodiments, images that have undergone multiple detections through multiple image processing schemes may be provided to a machine assisted human labeling operation and/or for selection for further training of ML models used in the process 1900. In some embodiments, the resulting user assistance and training may be used for further improvements of ML performance metrics. For example, an optional visualization may be provided to allow a user to track improvements that are performed through the application of multiple image processing schemes. In the process 1900, the multi-scheme operation may rely on various attributes of pixels such as dividing images into background/foreground, using dept of pixels to identify which pixels represent ground and which pixels may represent vegetation, using pixel colors to provide bounding boxes that contain detected objects, and so on. FIG. 8 and associated description provides some examples of embodiments of the process 1900.

A method of processing agricultural images according to the foregoing techniques includes comparing object detections performed by multiple image processing schemes to determine a set of ground truth images from which at least one machine learning (ML) model used by at least one ML algorithm included in the multiple image processing schemes is trained, wherein the multiple image processing schemes include two or more of; (a) an image processing scheme that includes a cascade of multiple ML algorithms; (b) an image processing scheme that includes image annotation based on user feedback; (c) an image processing scheme that includes a cascade of an ML algorithm or a computer vision (CV) algorithm and a user feedback. In some embodiments, (c) comprises first annotating images using the ML algorithm or the CV algorithm, followed by the user feedback. In some embodiments, (c) comprises first annotating images using the user feedback, followed by annotating images using the ML algorithm or the CV algorithm. In some embodiments, the set of ground truth images includes a first set of images analyzed by the multiple image processing schemes and a second set of images that are intervening images where results of the first set of images are propagated.

Multi-Model Training and Refinement

Figure 10:
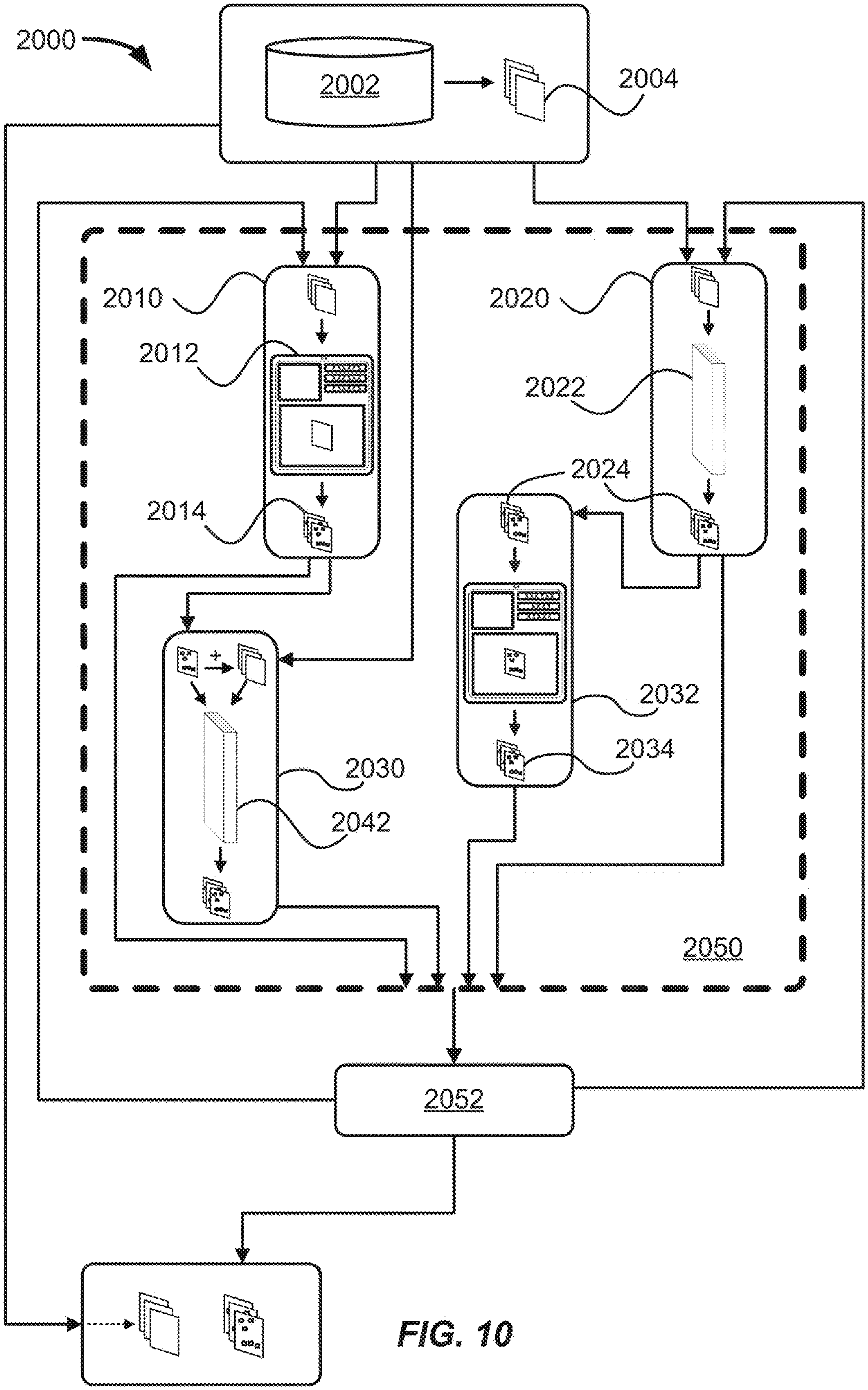
FIG. 10 shows an example of training ML models for agricultural image processing.

FIG. 10 depicts an example scheme 2000 that highlights the training aspect, among other things, of an agricultural image processing system. A database 2002 may store images of an agricultural environment. Some, or all, of these images (2004) may be provided to multiple ML detection schemes in the data labelling pipeline 2050. For example, in image processing scheme 2010, a user may annotate images using a user interface 2012 on which user feedback is provided to generated labeled images 2014. The labeled images 2014 can be used recognized as a group of ground truth images or training set or labelled images 2052 for further training. In one example, in image processing scheme 2030, the labelled images 2014, from image processing scheme 2010, can be ingested and processed via a propagation algorithm 2042 configured to propagate the labels of labelled image 2014 to subsequent or prior captured image frames near the captured image that was used to create labelled image 2014. The propagated images can also be recognized as a group of ground truth images or training set or labelled images 2052 for further training. In another example, in image processing scheme 2020, an ML algorithm or model or CV algorithm may ingest input images and annotate using an image processing scheme 2022 to produce annotated images 2024. The image processing scheme 2022 may be an ML scheme or a CV scheme. The annotated images may be input to an image processing scheme 2032 in which user feedback may be used to further improve object detection including procuring labelled images 2034. In one example, the labelled or annotated images 2024 can be used directly as ground truth images or labelled images 2052 (using pseudo labelling, that is model label data and incorporating the model annotations into a training set). In one example, the annotated images 2024 can be corrected, confirmed, verified, optimized, by a user via user interface to generate labelled images 2034. The labelled images 2034 can be recognized as a group of ground truth images or training set or labelled images 2052 for further training. An image processing scheme may ingest images, annotated images output from an image processing scheme and use a further ML algorithm to perform object detection. Resulting annotated images of all the various ways of image annotation and ML detection of objects may be verified or compared. Here, a determination may be made regarding ground truth images based on the comparison to determine which images should be labeled and selected for further training of ML algorithms used in the scheme 2000.

Figure 11:
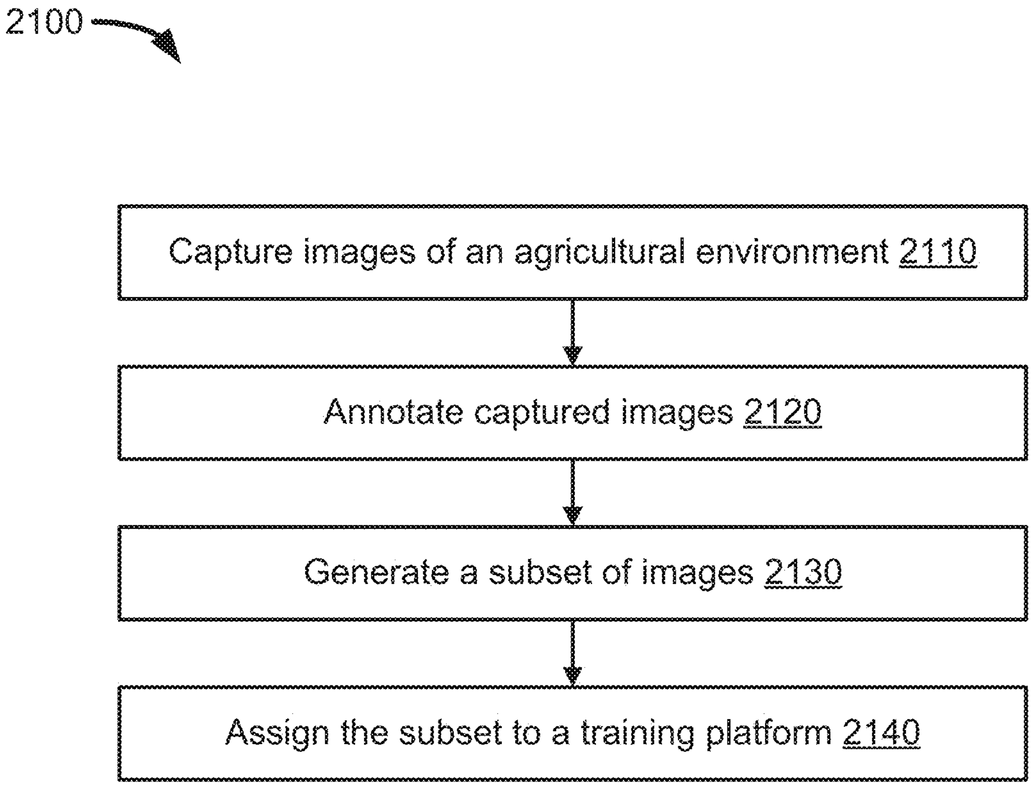
FIG. 11 is a flowchart of an example method of processing agricultural images.

A first set of preferred solutions implemented by some embodiments includes:

1. A computer-implemented method of processing images (e.g., method 2100 depicted in FIG. 11), comprising: capturing (2110), using one or more cameras deployed on an agricultural platform images of an agricultural environment in which the agricultural platform is operating; annotating (2120) the images using a first machine learning (ML) algorithm, wherein each annotation includes a confidence number associated with the each annotation, and wherein the first ML algorithm is trained based on a second set of images captured by the one or more cameras; generating (2130) a subset of the images as a training set for further training of the first ML algorithm, wherein the subset of the images in the training set is generated partially based on a user feedback; and transmitting (2140) the subset of images to a training platform that generates a second ML model by training of the first ML algorithm using the subset of image data.

2. The method of solution 1, wherein the annotation comprises adding bounding boxes to objects detected in the images.

3. The method of claim 1, wherein the annotation comprises adding a syntax element or a pixel to objects detected in the images.

4. The method of solution 1, wherein the training set is generated by: determining that a particular confidence number associated with a portion of a particular image is below a threshold; providing, based on the determining, the portion of the particular image on a user interface of a user device that is different from the agricultural platform; receiving, after the providing, an input on the user interface, wherein the input indicates a mode of further processing the particular image; and selectively including, based on the input on the user interface, the particular image in the training set.

5. The method of solution 1 wherein the training set is generated by: determining that a particular confidence number associated with a portion of a particular image is below a threshold; providing, based on the determining, a real-world location indication for the portion of the particular image; receiving, after the providing, an input on the user interface, wherein the input indicates a mode of further processing the particular image; and selectively including, based on the input on the user interface, the particular image in the training set.

6. The method of solution 1, wherein the training set is generated as the subset of the image data using active learning in which the subset of images is generated using an exclusion criterion that excludes images similar to images that were previously user-verified, or an inclusion criterion that includes images having an aggregate low confidence level.

Figure 12:
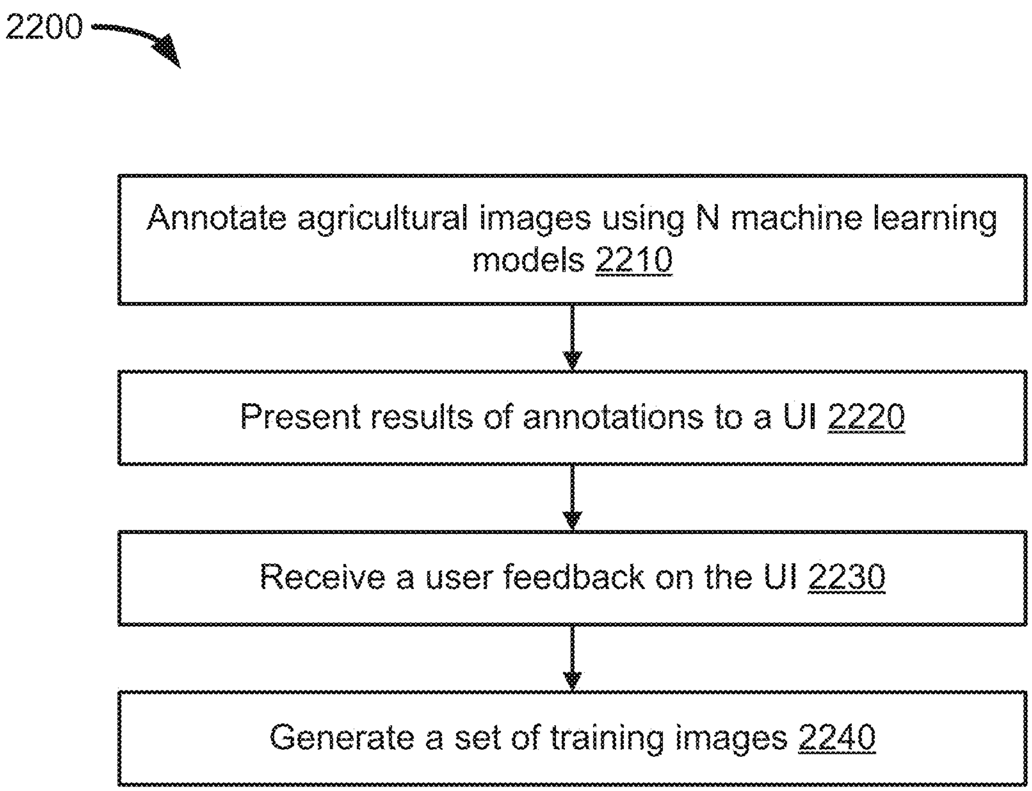
FIG. 12 is a flowchart of an example method of processing agricultural images.

A second set of preferred solutions implemented by some embodiments includes:

1. A machine learning method (e.g., method 2200 depicted in FIG. 12), comprising: annotating (2210) agricultural images using N machine learning (ML) models, where N is an integer greater than 1; presenting (2220) results of annotation by the N ML models on a user interface; receiving (2230) a user feedback for the results of annotation by the N ML models; and generating (2240) a set of training images based on the user feedback.

2. The method of solution 1, wherein the N ML models correspond to different versions of a same ML model.

3. The method of solution 1, wherein the N ML models implement different ML models.

4. The method of solution 1, wherein the results of annotation are presented by highlighting conflicting annotations.

5. The method of solution 1, wherein the results of annotation are presented by presenting uncertain annotations.

6. The method of solution 1, further including, using the training images to further train at least some of the N ML models.

7. The method of solution 1, further including, using the training images to generate an (N+1)st ML model.

Figure 13:
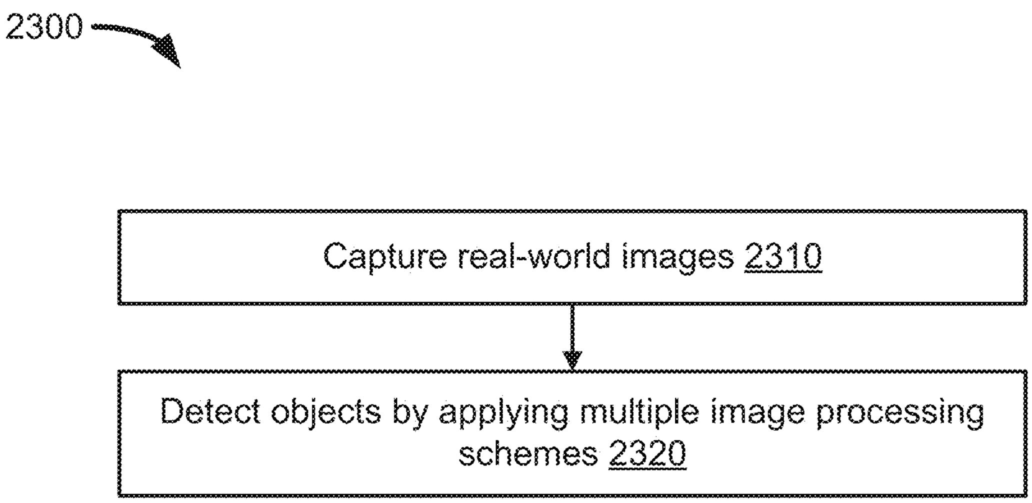
FIG. 13 is a flowchart of an example method of processing agricultural images.

A third set of preferred solutions implemented by some embodiments includes:

1. A method of processing image data (e.g., method 2300 depicted in FIG. 13), comprising: capturing (2310) real-world images of an agricultural environment, wherein each real-world image comprises a plurality of pixels, wherein a corresponding depth value and corresponding one or more color values are associated with each pixel of the plurality of pixels; and detecting (2320) one or more agricultural objects of interest in the real-world images by applying multiple image processing schemes to the real-world images, wherein the multiple image processing schemes include a depth value-based image processing scheme and a color value-based image processing scheme, wherein at least one of the multiple image processing schemes use a machine learning (ML) model.

2. The method of solution 1, wherein the multiple image processing schemes are applied in an order comprising first applying the depth value-based image processing scheme in which a subset of pixels whose depth values do not meet a threshold are eliminated from further processing.

3. The method of solution 2, wherein the depth value-based image processing scheme uses the ML model.

4. The method of solution 1, wherein the multiple image processing schemes are applied in an order comprising first applying the color value-based image processing scheme in which a subset of pixels whose color values do not meet a criterion are eliminated from further processing.

5. The method of solution 4, wherein the color value-based image processing scheme uses the ML model.

6. The method of solution 1, further including: selectively performing a treatment action on the one or more agricultural objects of interest based on a rule, wherein the rule specifies to apply a treatment to a first agricultural object that is detected to be a weed, or refraining from applying a treatment to a second agricultural object that is not detected to be an undesirable object.

7. The method of solution 6, wherein the treatment comprises spraying a pesticide or shooting a laser beam.

In some embodiments, the above-described method solutions may be implemented by one or more processors on a computer platform that may be deployed in an agricultural environment.

Example Embodiments for ML Model Training

In some embodiments, field operation of a moving platform (e.g., an agricultural vehicle or an aerial vehicle, etc.) may generate a large amount of data during the operation. One of the challenges faced in managing such a large amount of data is to be able to filter, or cull, data (e.g., sensor input or image data) that is not useful for an intended purpose and data that is useful for an intended purpose such as identification and treatment of agricultural objects such as fruits, vegetables, weeds, and so on. In particular, during real-time operation in a field environment, the algorithm used for processing images, e.g., a ML model used for ML based object identification, may remain unchanged. However, the data gathered during this operation, or data gathered in other locations, may be used to further train the ML model for future use. As further described herein, some embodiments may use certain rules or criteria to prune or reduce the amount of data collected to a smaller subset that is used for such a subsequent training. Various rules and criteria for data pruning may be possible. For example, in some cases, the collected data may be continuously processed in real-time, but only images collected every so-often may be used for subsequent training.

For example, a predetermined period may be used to sample images for further training. The predetermined period may be, e.g., once every 5 seconds or once every 10 seconds. In some embodiments, the predetermined period may be a function of how many times have images of a particular agricultural environment been captured and analyzed previously. For example, when making a first run in location (e.g., a farm) because the ML model may be relatively untrained for this location, a greater number of images may be captured. In other words, the predetermined period of capture of images for subsequent training may be below a threshold (e.g., one image every second). During each subsequent run in this location, fewer and fewer images may be retained for subsequent training of the ML model. For example, the predetermined period may be adjusted from one second to 5 or 10 seconds, or greater.

Another rule or criteria may be based on distance traversed by the moving platform on which the sensors capturing the images are located. For example, images captured every 5 to 10 feet may be collected for subsequent training. Similar to the predetermined time period, the predetermined spatial distance at which images are collected may also depend on how many data collection/processing runs have previously been made at a particular location. Initially, data may be retained more frequently for training (e.g., once every 2 feet). Subsequent collections may reduce data collections to greater distances, e.g., once every 5 or 10 feet or greater. The distance may also depend on how many objects of interest are being identified. For example, fewer objects being detected in a certain region may result in an increase in the distance at which images captured are used for further training. Conversely, if a large number of objects of interest are detected in a certain region, then a greater number of frames may be used for subsequent display and/or training.

Other rules used for data pruning may include a combination of one or more of: use the image data for every object of interested that is detected above a certain confidence level threshold (or alternatively, below a certain confidence level), image data corresponding to each object of interest for which a particular subsequent action is taken, e.g., a treatment action is performed, and so on.

Figure 14:
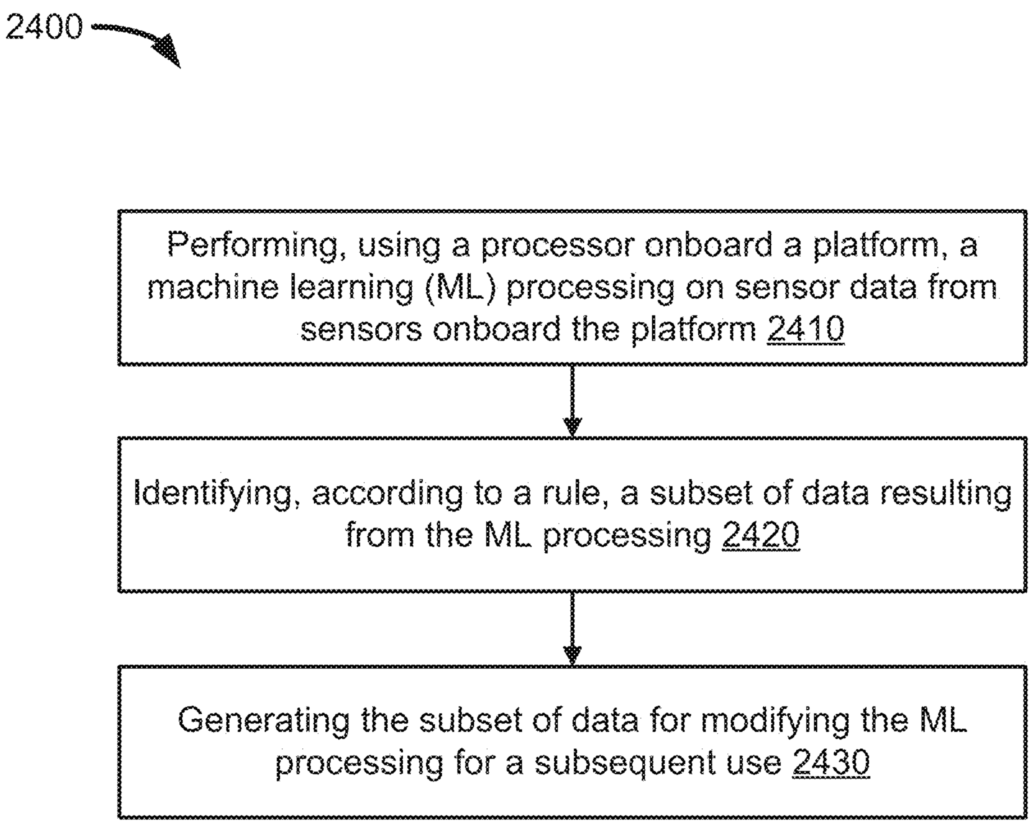
FIGS. 14-18 are flowchart examples of methods described in the present document.
Figure 15:
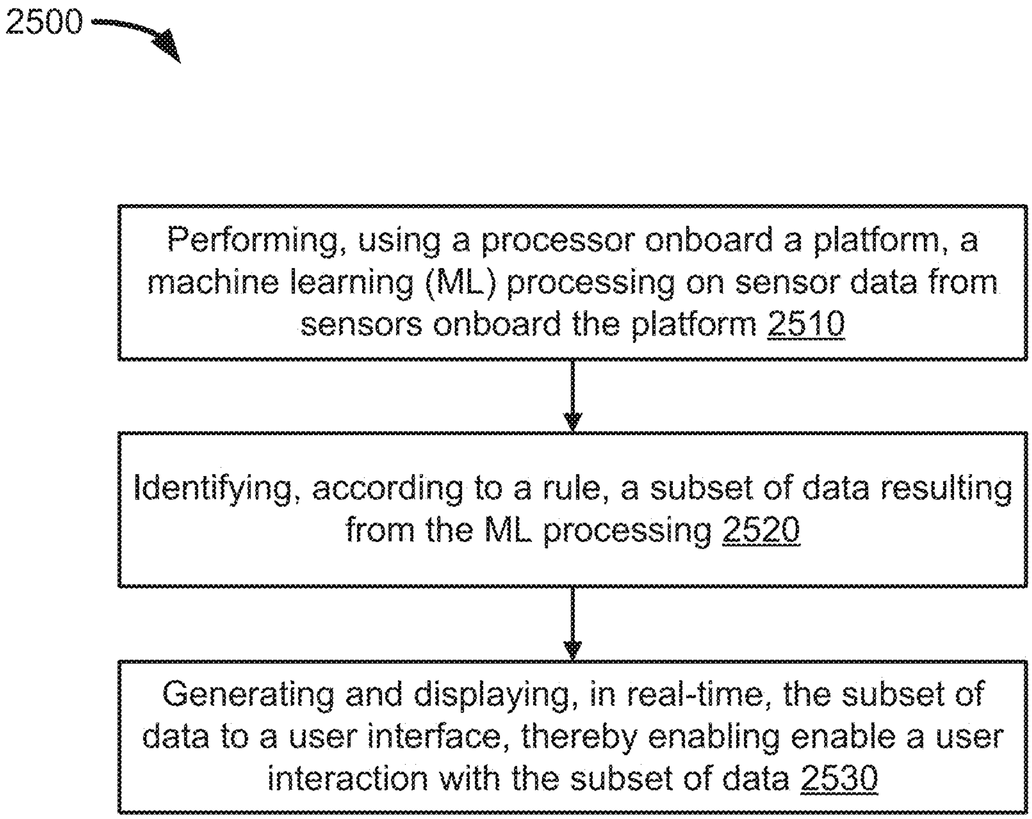
Figure 16:
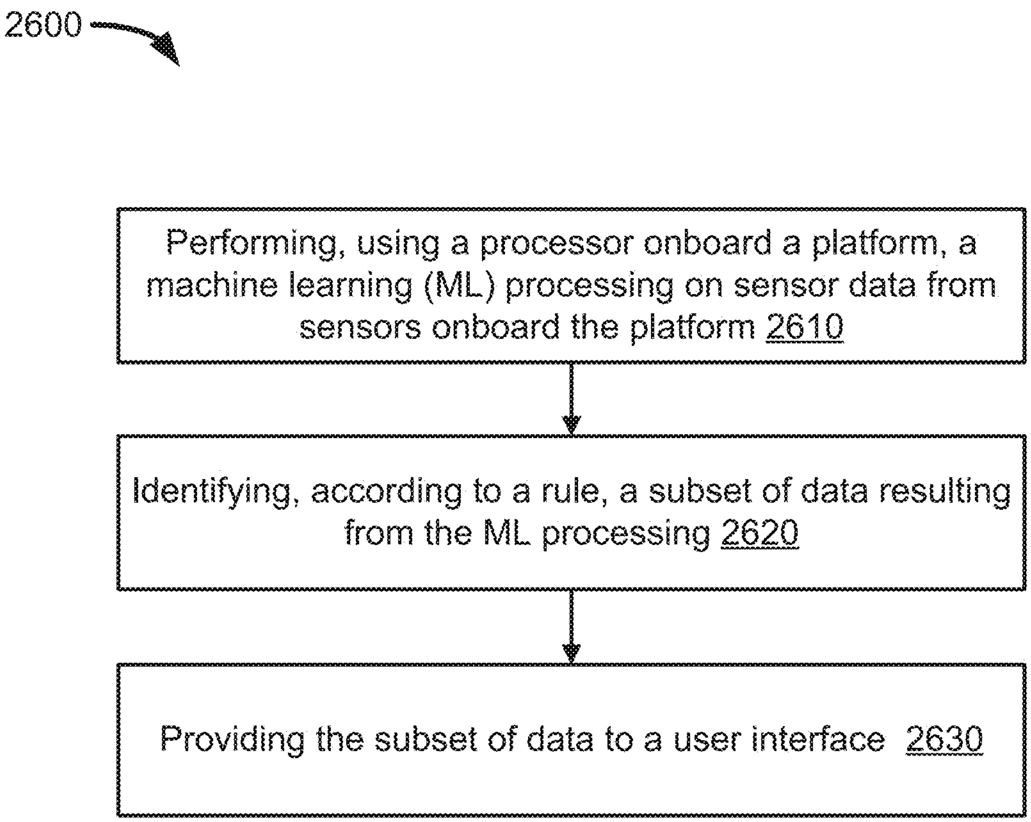
Figure 17:
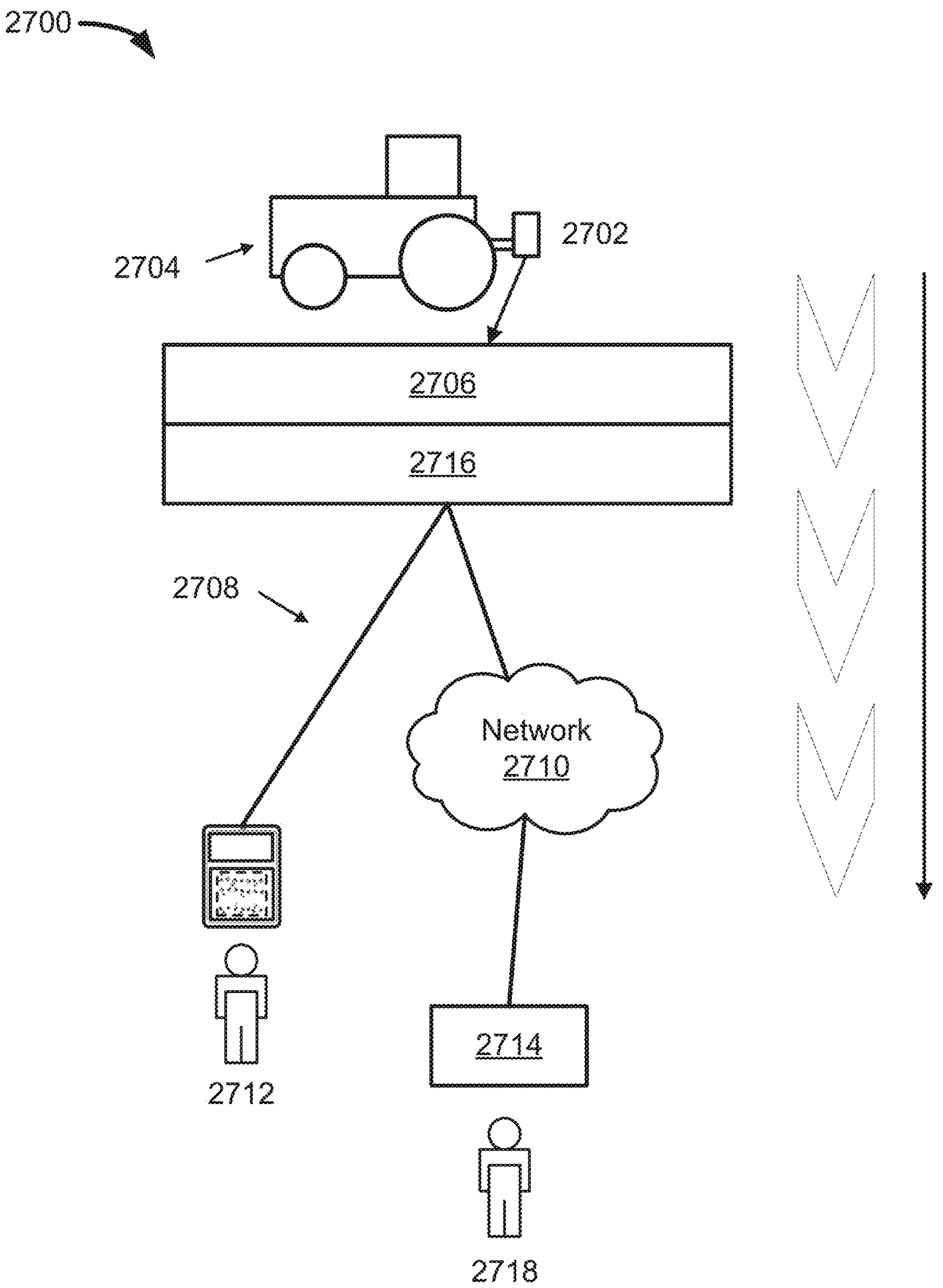

FIG. 17 shows an example overview of the data culling process 17000 and FIGS. 14-16 provide additional implementation examples of this process. As show in FIG. 17, right hand side, one feature of this process is a reduction in the amount of data that is processed by every subsequent data processing operation. In one advantageous aspect, such an arrangement allowed for allocation of commensurate computational resources. In another advantageous aspect, by reducing the amount of data stored and processed, real-time responsiveness of the image data processing and decision making in a field is possible even in cases where computational resources may be limited or battery operated.

As depicted in FIG. 17, a moving platform 17004 may be configured with one or more sensors 17002 such as various sensors (cameras, lidar, depth sensors, etc.) described herein. The sensor input from these sensors may be processed through an initial processing stage 17006. The sensor input may be organized, for example, as a sequence of images. The initial processing stage 17006 may identify portions of the images as containing one or more objects of interest. These portions may be, for example, rectangular patches (see, e.g., FIG. 3) that include the one or more objects of interest.

The initial processing stage 17006 may provide the image portions to the culling or filtering stage 17016 in which a rule may be applied to the data to determine the subset of data on which further processing is to be performed. As described with reference to FIGS. 14 to 16, the further processing may be displaying the data to a human user to get feedback from the user and/or using the data for generating a training set that is used for further training of the initial processing stage 17006. For example, the further processing may display subsets of images to a human reviewer present in the field near the moving platform 17004 using a communication connection 17008. The communication connection 17008 may be a wired connection such as Ethernet or a short rage wireless connection or a wireless local area network connection. For example, a farmer 17012 operating a tractor equipped with a computer which an ML algorithm is running may be able to, in real-time, view various agricultural objects detected by the ML algorithm, and provide instantaneous feedback regarding accuracy of object identification. The farmer's feedback may be collected and used for subsequent training of the ML algorithm.

As depicted in FIG. 17, alternatively, or in addition, the further processing, as depicted in diagram 2700, may include providing a subset of image data to a viewing device 2714 to a human reviewer 2718 over a network 2710 or providing a subset of image data to a viewing device 2708 over a network to a human review 2712. A typical use case may be that the human reviewer 2718 is located in an off-site location and may be monitoring, either in real-time or non-real-time, performance of the initial processing stage 2706 in the field. The human reviewer 2718 may provide feedback about accuracy of the detected one or more objects of interest. In one example, the human reviewer 2712 may be present in the field where the sensor input is captured and may thus be aware of the ambient conditions such as ambient light, the human reviewer 2718 may be off-site, not directly exposed to the same ambient conditions and may in fact be situated to review data collected from different field locations and different moving platforms 2704 and component treatment modules 2702. In one example, a human reviewer 2712 may be observing the treatment module 2702 perform in real time in an agricultural environment. The subset of image data can be further processed in image processing stage 2716 such that detections of a certain object type above or below a certain criteria (e.g confidence threshold, number of detections in a given frame, etc.) can be sent to a review 2712 or 2718. In one example, if a series of incorrect detections are being displayed on reviewer 2712 or reviewer 2718, a human can cease operations. In another example, if a reviewer, for example reviewer 2718, in real time, is seeing that at the image processing stage 2716, the treatment module 2702 is not sending any subset of data via the network 2710 to the reviewer 2718, the reviewer 2718 may infer that there are no plant objects, or target objects, or both, in the vicinity of the moving platform 2704 operating the particular region the moving platform 2704 is operating on at the moment. And in this example, the reviewer 2718 can indicate for the moving platform 2704 to move faster (either autonomously or signal an operator of the moving platform 2704 to speed up). Finally, the feedback from the reviewers may be used to provide further training and updates of the ML model used in the initial processing, as indicated by the downward feedback line.

It will be appreciated that the above-disclosed arrangement may operate like a "flywheel" that grabs a large amount of data from sensors, and in real-time, produces smaller amount of data that contains objects of interest and presents this information for further processing. Depending on operational conditions, the amount of data reduction in such a scheme may be by a factor of 100 or over a million times less data that is used for subsequent training compared to the volume of data captured by the sensors.

In some embodiments, a computer-implemented method of sensor input processing (e.g., method 2400 depicted in FIG. 14) may include performing (2410), using a processor onboard a vehicle, a machine learning (ML) processing on sensor input from sensors onboard the vehicle; identifying (2420), according to a rule, a subset of data resulting from the ML processing; and generating (2430) the subset of data for modifying the ML processing for a subsequent use.

In some embodiments, the modifying the ML processing for the subsequent use comprises training an ML model based on a training set generated from the subset of data.

In some embodiments, the training set is generated by: determining that a particular confidence number associated with a portion of a particular image is below a threshold; providing, based on the determining, the portion of the particular image on a user interface of a user device that is different from the vehicle; receiving; after the providing; an input on the user interface; wherein the input indicates a mode of further processing the particular image; and selectively including, based on the input on the user interface, the particular image in the training set.

In some embodiments, the training set is generated by: determining that a particular confidence number associated with a portion of a particular image is below a threshold; providing, based on the determining, a real-world location indication for the portion of the particular image; receiving, after the providing, an input on the user interface; wherein the input indicates a mode of further processing the particular image; and selectively including, based on the input on the user interface, the particular image in the training set.

In some embodiments, the training set is generated as a subset of the sensor input using active learning in which the subset of the sensor input is generated using an exclusion criterion that excludes sensor input images similar to other sensor input images that were previously user-verified, or an inclusion criterion that includes sensor input images having an aggregate low confidence level. In one example, the inclusion criterion can be input images where ML detector detects a certain type of objects close to each other in the real world.

In some embodiments, in the rule defines the subset of data to include portions of images obtained from the sensor input at a predetermined time interval.

In some embodiments, the rule defines the subset of data to include every Nth image of the sensor input, where N is a positive integer. For example, based on operational conditions such as resource availability or density of agricultural objects, the number N may be pre-defined or selected at run-time. For example, fewer images (e.g., greater value of N) may be processed in a low-density agricultural environment. In some embodiments, wherein the rule defines the subset of data to include portions of images obtained from the sensor input after a predetermined physical movement of the vehicle.

In some embodiments, the rule defines the subset of data to include portions of images according to a detection criterion upon the ML processing.

In some embodiments, the generating the subset of data comprises adding bounding boxes or syntax elements or pixels to objects that are detected in images obtained from the sensor input.

In some embodiments, the method further includes identifying one or more target objects based on the ML processing, and performing a treatment action on the one or more target object by controlling a treatment mechanism mounted on the vehicle.

In some embodiments, the vehicle is an agricultural vehicle operating in an agricultural environment, and wherein the user interface is displayed on a device that is at a different geographic location than the agricultural environment.

In some embodiments, a treatment module configured to perform a treatment action is disposed on the vehicle and wherein the rule defines the subset as a portion of the sensor input that is expected to include the treatment action on a target object.

In some embodiments, upon detecting absence of the treatment action in the portion of the sensor input that is expected to include the treatment action on the target object, information is sent to the user interface to enable a human intervention.

Examples of Real-Time User Control

1. A processor-implemented method (e.g., method 2500 depicted in FIG. 15), comprising: performing (2510), using a processor onboard a vehicle, a machine learning (ML) processing on sensor input from sensors onboard the vehicle; identifying (2520), according to a rule, a subset of data resulting from the ML processing; and generating and displaying (2530), in real-time, the subset of data to a user interface, thereby enabling a user interaction with the subset of data.

In some embodiments, the vehicle is an agricultural vehicle operating in an agricultural environment, and wherein the user interface is of a display device mounted on the vehicle or of a portable electronic device controlled by a field operator in the agricultural environment.

In some embodiments, the rule specifies that the subset of data resulting from the ML processing comprises portions of images obtained from the sensor input that, wherein the portions of images include one or more target objects subject to a treatment by a treatment mechanism under control of the processor.

In some embodiments, the rule defines the subset of data to include portions of images obtained from the sensor input at a predetermined time interval.

In some embodiments, the rule defines the subset of data to include portions of images obtained from the sensor input after a predetermined physical movement of the vehicle.

In some embodiments, the rule defines the subset of data to include portions of images according to a detection criterion upon the ML processing.

In some embodiments, the vehicle is an agricultural vehicle operating in an agricultural environment, and the user interface is displayed on a device that is at a different geographic location than the agricultural environment. For example, as depicted in FIG. 4D, the computing device on which the user interface is displayed may be communicating with the vehicle through a cloud network and may be located in a geographic location far away from a farm.

In some embodiments, a treatment module configured to perform a treatment action is disposed on the vehicle. The rule may define the subset as a portion of the sensor input that is expected to include the treatment action on a target object. For example, the treatment module may be controlled to perform a treatment action on a particular target object and therefore the sensors may be controlled to capture images near the target object.

In some embodiments, upon detecting absence of the treatment action in the portion of the sensor input that is expected to include the treatment action on the target object, information is sent to the user interface to enable a human intervention. This information may include, for example, location of the target object where a treatment action failed, such that a human may be able to physically walk over to this location to find out why treatment was not performed.

Examples of Selective Data Culling for Training

In some embodiments, a processor-implemented method (e.g., method 2600 depicted in FIG. 16) may include performing (2610), using a processor onboard a vehicle, a Machine Learning (ML) processing on sensor input from sensors onboard the vehicle; identifying (2620), according to a rule, a subset of data resulting from the ML processing; and providing (2630) the subset of data to a user interface.

In some embodiments, the sensor input comprises image data, wherein the ML processing comprises annotating patches of the image data using annotations associated with each patch, wherein each annotation includes a confidence number associated with a confidence level with which the ML processing has identified an object of interest in a corresponding patch of image data.

3 In some embodiments, the annotation comprises adding bounding boxes to objects detected in the image data.

In some embodiments, the annotation comprises adding a syntax element or a pixel to objects detected in the images. In some embodiments, the annotation comprises a yes/no label (e.g., true/false selection for a specific object type) or a selection from a pre-determined set of selections (e.g., this is a weed, this is a crop, this is soil, this is nothing, etc.).

In some embodiments, further including receiving user feedback on the user interface for the subset of data; generating, based on the user feedback, a training set for further training of an ML model used by the ML processing; and training the ML model using the training set for future use.

In some embodiments, the training set is generated by: determining that a particular confidence number associated with a portion of a particular image is below a threshold; providing, based on the determining, the portion of the particular image on the user interface of a user device that is at a different geographic location than a location of the vehicle; receiving, after the providing, an input on the user interface, wherein the input indicates a mode of further processing the particular image; and selectively including, based on the input on the user interface, the particular image in the training set.

In some embodiments, the training set is generated by: determining that a particular confidence number associated with a portion of a particular image is below a threshold; providing, based on the determining, a real-world location indication for the portion of the particular image on the user interface; receiving, after the providing, an input on the user interface, wherein the input indicates a mode of further processing the particular image; and selectively including, based on the input on the user interface, the particular image in the training set.

In some embodiments, the training set is generated as the subset of the image data using active learning in which the subset of images is generated using an exclusion criterion that excludes images similar to images that were previously user-verified, or an inclusion criterion that includes images having an aggregate low confidence level.

In some embodiments, the subset of data includes non-sequential frames of the sensor input and the training set includes intermediate frames between the non-sequential frames, wherein the intermediate frames are used as the training set by propagating user feedback received for the non-sequential frames. For example, every Nth frame may be processed by the ML algorithm or user feedback, and a tracking algorithm may track the decisions for the intermediate frames between the N frames. Here, N may be a positive integer with a typical value between 1 and 100.

In some embodiments, the vehicle is operating in an agricultural environment and wherein the sensors comprise one or more of a depth sensor, a light detection and ranging (LiDAR) sensor, or an infrared camera.

In some embodiments, the vehicle is operating in an agricultural environment, and wherein the user interface is located on a user device in the agricultural environment.

In some embodiments, the vehicle is operating in an agricultural environment, and wherein the user interface is located on a user device that is not in the agricultural environment.

Examples of Image Data Handling

In some embodiments, each treatment module may be configured with one or more cameras that are configured to capture images of the surrounding agricultural area. A camera may be configured to capture images at a first resolution and a first frame rate and transfer the images to the processing circuitry onboard the treatment system. In some embodiments, the first resolution and/or the first frame rate may be the highest resolution or frame rate that the entire system is designed to handle. For example, in some embodiments, the cameras may be configured to capture the agricultural images at 8K resolution and 2400 frames per second.

In some embodiments, the image data may be handled in the following operations:

Operation 1: An image may be captured at a first resolution.

Operation 2: The captured image is stored in a memory at the captured resolution.

Operation 3: N downsampled versions of the image are generated. N is a positive integer. The downsampling ratio may be in multiple powers of 2, e.g., 2, 4, 8 or greater in both X and Y directions.

Operation 4: A downsampled version is made available to a process that identifies one or more areas of interest within the downsampled version. Compared to the full resolution image at the first resolution, the downsampled version may include 1/64th or 1/128th the amount of pixel data.

Operation 5: A request to fetch additional data from the original captured image based on the processing of the downsampled image data is received. The request may identify an (x, y) location of a top-left pixel location in the downsampled image data and a shape or other description of the region of interest.

Operation 6: An inverse mapping of the requested image data may be performed and the corresponding data from the original image may be sent across a memory bus to an image processing section for further processing. The remaining image data may be deleted from the memory or marked for reuse.

Operation 7: At some time during the operations 5, 6, a next image at the first resolution may be captured and stored in the memory.

Examples of Image Processing at Different Levels of Details

As previously described with reference to FIG. 17, upon reception of images at the first frame rate and first resolution, a downsampling function of the processing circuitry may generate a downsampled version of the images. In some embodiments, the downsampling may be performed using a pre-defined set of filters and a pre-defined set of downsampling factors. In some embodiments, a specific downsampling filter and/or a downsampling factor may be selected and provided to the downsampling function based on operational decisions as disclosed herein. Briefly, these decisions may include ambient light, a type of crop being raised in the agricultural farm and so on.

In some embodiments, the multi-resolution image processing may comprise separating the captured image into different colors. For example, an image captured with 24-bit pixel value representation may be separated into lower resolution images by separating into three colors, each having 8-bit pixels.

In some embodiments, the captured frame detail (e.g., the resolution) may be greater than the image detail used for identifying objects within the frame.

In some embodiments, multiple machine learning (ML) models, each trained and configured to operate at a different resolution, may be executed on the treatment system. For example, a first ML algorithm may be used on a reduced detail image.

Examples of Using Multiple ML Models at Multiple Levels of Details

In one example, ML model 1 may be trained to detect certain agricultural objects (e.g., any of weeds, crop or soil) at a first resolution. ML model 1 may detects crop with high certainty (e.g., above a threshold 1). If the detection falls below threshold 1, then the detection may be reported for further processing (see, e.g., FIG. 8B). The same image region may be sent as an input to ML model 2. In different embodiments, ML model 2 may be configured to operate at different levels of details, e.g., lower resolution, or lower pixel height/width or a different layer of image (e.g., a single color or different number of bits per pixel). The ML model 2 may be trained to classify the object in the image region as a soil object, a crop object or a weed object. Depending on the classification of the type of object, the result and the image region may be uploaded for further processing. For example, all findings of "soil" object type may be uploaded in one embodiment, while all findings of a "weed" object type may be uploaded in another embodiment. In general, which type of object detections to upload may be programmed according to operational criteria. The uploaded image region and ML classifications may be used for further training, visual classification by a human or an independent ML mode (different from ML1 and ML2).

Soil Detection Embodiments

In some embodiments, the ML models used herein may be used for detecting a certain type of soil and/or to gauge an amount of moisture in the soil. For example, ML models may be trained to identify various soil types and soil textures based on amount of water in the soil. In some embodiments, soil may be treated in a similar manner as other agricultural objects (e.g., train ML models at a certain level of image detail and/or use human feedback during training). In some embodiments, various soil textures may be treated separately, resulting in identification of multiple types of soil objects, e.g., "wet soil," "tilled soil" etc. In some embodiments, recognizing that soil may appear to have a large variation in texture, e.g., top soil, fertilized soil, soil with tier marks, and so on, various different identifications may all be simply labeled as "soil" and treated as such in the subsequent agricultural operations. In some embodiments, soil detection via image processing may be combined together with detection of other agricultural objects to further increase a confidence level.

In some embodiments, sod detection models, and other ML models, may be trained by sending a subset of images for human input. Such an input may be used to train parameters of ML model related to soil texture, soil color shade, whether a counter or pattern in soil represents a crack or a root or another object and so on. In some embodiments, every image region where a soil crack is detected may be sent for human verification about whether the crack is indeed a crack or a weed, a leaf or a root, e.g., a baby carrot leaf.

Example Embodiments of Capture and Identification of Target Action

Figure 18:
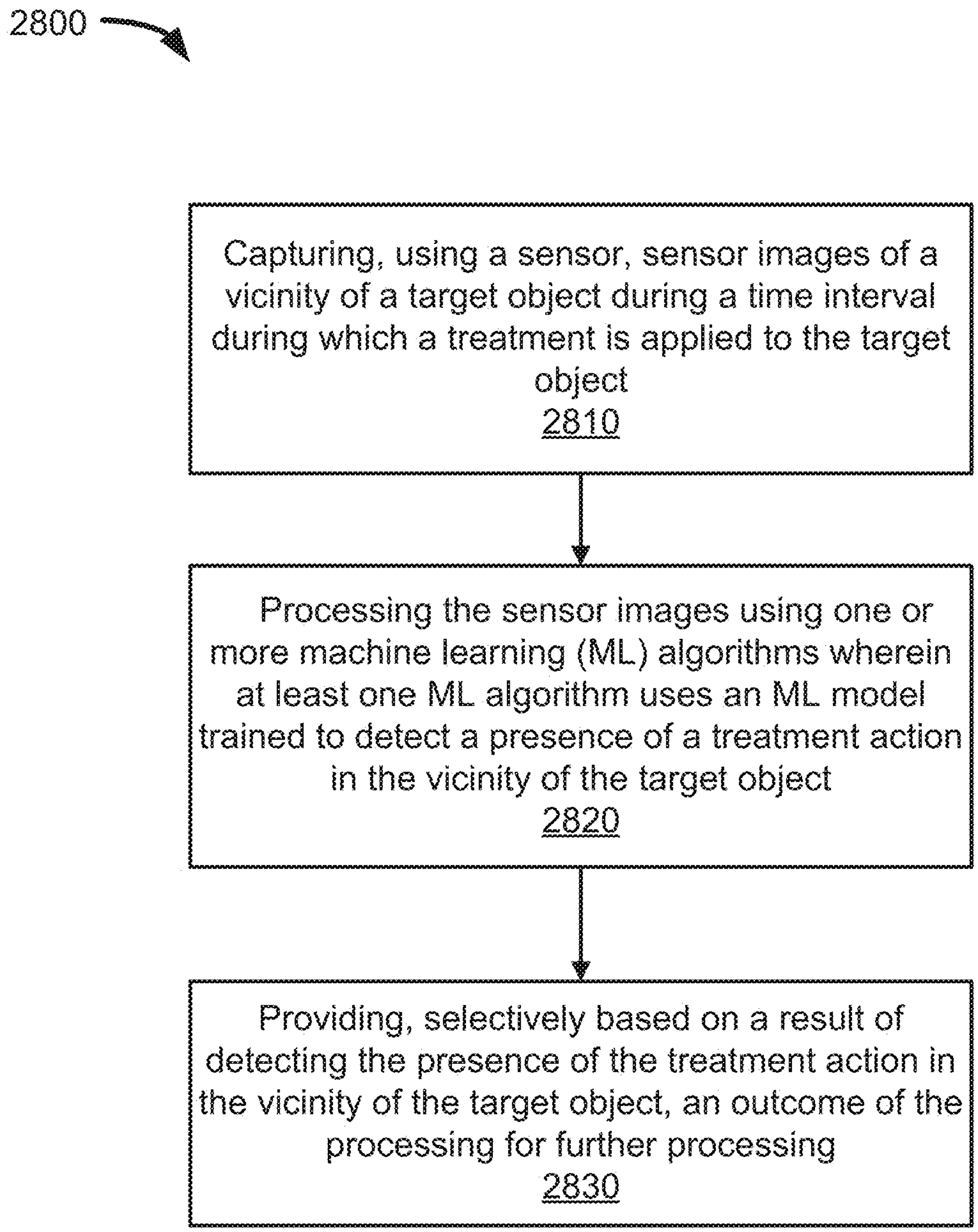

As disclosed with reference to FIGS. 4A-4D, in some embodiments, a treatment action may be captured by sensors and automatically identified using sensor input processing techniques disclosed herein. FIG. 18 is a flowchart for an example method 2800 of sensor input processing. The method 2800 may be implemented by the agricultural platform or vehicle disclosed herein.

At 2810, sensor images of a vicinity of a target object may be captured during a time interval during which a treatment is applied to the target object. The number of captured images may vary from a single image up to several tens or hundreds of images that show the treatment action.

At 2820, the one or more sensor images are processed using one or more machine learning (ML) algorithms wherein at least one ML algorithm uses an ML model trained to detect a presence of a treatment action in the vicinity of the target object.

At 2830, selectively based on a result of detecting the presence of the treatment action in the vicinity of the target object, an outcome of the processing is provided for further processing.

In some embodiments, the processing is performed using at least two ML algorithms including a first ML algorithm trained to process sensor images at a greater resolution than a second ML algorithm that is trained to detect the presence of the treatment action in the vicinity of the target object. For example, the first ML algorithm may analyze a bigger sized image such as a 768×768 or a 4K image, while the second ML algorithm may operate on a smaller sized image. For example, as depicted in FIGS. 4A to 4D, a segment or a region of image that possibly includes an object of interest may be processed by the second ML algorithm. Some additional examples are disclosed with reference to FIG. 17.

In some embodiments, the processing is performed using at least two ML algorithms including a first ML algorithm trained to process sensor images at a lower resolution than a second ML algorithm that is trained to detect the presence of the treatment action in the vicinity of the target object. For example, the first ML algorithm may analyze a downsampled smaller version of a full-resolution (e.g., 8K resolution) image to identify portions or segments of the image where objects are detected and eliminating portions where no objects are seen. The second ML algorithm may then operate on a higher resolution version corresponding to the segment or portion in the downsampled image identified by the first ML algorithm. Some examples are disclosed with reference to FIG. 17.

In some embodiments, in case that the result of detecting indicates that the treatment action is detected from the sensor images, then the outcome is provided to a database for indicating a success of treatment. For example, the database 1126 may be used for storing the results at an offsite location. Alternatively, or in addition, the database may simply be in the form of a local storage at the computing device 1120.

In some embodiments, in case that the result of detecting indicates that the treatment action is not detected from the sensor images, then the outcome is provided to a user interface as a treatment error. For example, user interface of the computing device 1120 may be used for displaying the treatment error and feedback may be sought from a human operator in the agricultural environment in real-time, e.g., a corrective action by the user may be requested.

In various embodiments, the treatment action comprises ejection of a fluid towards the target object or emission of a laser beam towards the target object. Other possible actions include providing a fertilizer to a crop, or strewing seeds in soil, and so on.

In some embodiments, the method 2800 further includes providing the sensor images for the further processing. In different embodiments, the further processing may include one or more of the following: performing further training of an ML model for detection of treatment actions, providing a playback loop to play the captured images, providing a corrective feedback to the treatment mechanism in case that an expected treatment action is not observed. For example, this may occur when no treatment action is detected when one was expected, or treatment action was in excess of the intended treatment action, or the treatment action failed to reach the target object, and so on.

In various embodiments disclosed throughout the present document, a sensor input may comprise sensor data (e.g., a digital representation) or a sensor signal (e.g., an analog value) that is used for subsequent processing. Furthermore, the various machine-based image processing algorithms may label various objects detected in images or simply draw inferences about the objects. Similarly, object labeling may also be performed by a human user. For example, a machine learning method may draw inferences about objects in a sensor input frame, which may then be labeled to be a particular object based on human feedback such as yes or no. For example, a machine may draw an inference that an object is a weed with a 70% confidence, and a human user may provide a "yes" feedback, resulting in that object being labeled as a weed. In general, a first confidence threshold may be used for submitting objects to human labeling, while a second confidence threshold may be used to accept the detected object as being so. For example, all object detections between 40% and 90% may be submitted for human feedback, while object detections above 90% confidence may be accepted as being the detected object without requiring additional human input.

It will be appreciated that the present document discloses various techniques for processing of sensor inputs in an agricultural environment. In one beneficial aspect, analysis of such sensor inputs is used to automate certain agricultural operations such as weed elimination, cataloging of crop, sowing seeds, adding fertilizers and so on. In another beneficial aspect, an interface is provided for a human to interact with machine learning to be able to supervise and make corrections to certain automated tasks.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory, devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A computer-implemented method of sensor input processing, implemented by an agricultural platform comprising a processor and a sensor, comprising:

capturing, using the sensor, sensor images of a vicinity of a target object of a time interval during which a treatment action is applied to the target object;

processing the sensor images using one or more machine learning (ML) algorithms wherein at least one ML algorithm uses an ML model trained to detect a presence of the treatment action in the vicinity of the target object by (1) detecting the presence of the treatment action in the sensor images by comparing multiple consecutive sensor images, (2) having the one or more ML algorithms draw inferences about presence of the target object in the sensor images containing the treatment action, (3) associating a confidence number to each inference, (4) detecting the presence of the target object by subjecting objects within a percent range of confidence to a feedback from a human user, and (5) detecting the presence of objects above a percent confidence without any feedback from the human user; and providing, selectively based on a result of detecting the presence of the treatment action in the vicinity of the target object, an outcome of the processing for further processing.

2. The method of claim 1, wherein the processing is performed using at least two ML algorithms including a first ML algorithm trained to process sensor images at a greater resolution than a second ML algorithm that is trained to detect the presence of the treatment action in the vicinity of the target object.

3. The method of claim 1, wherein the processing is performed using at least two ML algorithms including a first ML algorithm trained to process sensor images at a lower resolution than a second ML algorithm that is trained to detect the presence of the treatment action in the vicinity of the target object.

4. The method of claim 1, wherein in case that the result of detecting indicates that the treatment action is detected from the sensor images, then the outcome is logged as a successful treatment.

5. The method of claim 1, wherein in case that the result of detecting indicates that the treatment action is not detected from the sensor images, then providing information on a user interface to enable a corrective action by a user.

6. The method of claim 1, wherein the treatment action comprises ejection of a fluid towards the target object, emission of a laser beam towards the target object, or orienting an end effector to interact with a surface portion of the target object.

7. The method of claim 1, further comprising:

providing the sensor images for the further processing.

8. An apparatus comprising at least one processor and a sensor, wherein the processor is configured to perform a method of sensor input processing, comprising:

capturing, using the sensor, sensor images of a vicinity of a target object in an agricultural environment of a time interval during which a treatment action is applied to the target object;

processing the sensor images using one or more machine learning (ML) algorithms wherein at least one ML algorithm uses an ML model trained to detect a presence of the treatment action in the vicinity of the target object by (1) detecting the presence of the treatment action in the sensor images by comparing multiple consecutive sensor images, (2) having the one or more ML algorithms draw inferences about presence of the target object in the sensor images containing the treatment action, (3) associating a confidence number to each inference, (4) detecting the presence of the target object by subjecting objects within a percent range of confidence to a feedback from a human user, and (5) detecting the presence of objects above a percent confidence without any feedback from the human user; and providing, selectively based on a result of detecting the presence of the treatment action in the vicinity of the target object, an outcome of the processing for further processing.

9. The apparatus of claim 8, wherein the at least one processor is configured to perform the processing using at least two ML algorithms including a first ML algorithm trained to process sensor images at a greater resolution than a second ML algorithm that is trained to detect the presence of the treatment action in the vicinity of the target object.

10. The apparatus of claim 8, wherein the at least one processor is configured to perform the processing using at least two ML algorithms including a first ML algorithm trained to process sensor images at a lower resolution than a second ML algorithm that is trained to detect the presence of the treatment action in the vicinity of the target object.

11. The apparatus of claim 8, wherein in case that the result of detecting indicates that the treatment action is detected from the sensor images, then the outcome is logged as a successful treatment.

12. The apparatus of claim 8, wherein in case that the result of detecting indicates that the treatment action is not detected from the sensor images, then providing information on a user interface to enable a corrective action by a user.

13. The apparatus of claim 8, wherein the treatment action comprises ejection of a fluid towards the target object, emission of a laser beam towards the target object, or orienting an end effector to interact with a surface portion of the target object.

14. The apparatus of claim 8, wherein the method further comprises:

providing the sensor images for the further processing.

15. A non-transitory computer-readable medium having code stored thereon; the code, upon execution by a processor of an agricultural platform comprising a sensor, causing the processor to implement a method; comprising:

capturing, using the sensor, sensor images of a vicinity of a target object of a time interval during which a treatment action is applied to the target object;

processing the sensor images using one or more machine learning (ML) algorithms wherein at least one ML algorithm uses an ML model trained to detect a presence of the treatment action in the vicinity of the target object by (1) detecting the presence of the treatment action in the sensor images by comparing multiple consecutive sensor images, (2) having the one or more ML algorithms draw inferences about presence of the target object in the sensor images containing the treatment action, (3) associating a confidence number to each inference, (3) detecting the presence of the target object by subjecting objects within a percent range of confidence to a feedback from a human user, and (5) detecting the presence of objects above a percent confidence without any feedback from the human user; and providing, selectively based on a result of detecting the presence of the treatment action in the vicinity of the target object, an outcome of the processing for further processing.

16. The non-transitory computer-readable medium of claim 15, wherein the processing is performed using at least two ML algorithms including a first ML algorithm trained to process sensor images at a greater resolution than a second ML algorithm that is trained to detect the presence of the treatment action in the vicinity of the target object.

17. The non-transitory computer-readable medium of claim 15, wherein the processing is performed using at least two ML algorithms including a first ML algorithm trained to process sensor images at a lower resolution than a second ML algorithm that is trained to detect the presence of the treatment action in the vicinity of the target object.

18. The non-transitory computer-readable medium of claim 15, wherein in case that the result of detecting indicates that the treatment action is detected from the sensor images, then the outcome is logged as a successful treatment.

19. The non-transitory computer-readable medium of claim 15, wherein in case that the result of detecting indicates that the treatment action is not detected from the sensor images, then providing information on a user interface to enable a corrective action by a user.

20. The non-transitory computer-readable medium of claim 15, wherein the treatment action comprises ejection of a fluid towards the target object, emission of a laser beam towards the target object, or orienting an end effector to interact with a surface portion of the target object.

* * * * *